United States Patent
Suemura et al.

(10) Patent No.: US 6,429,955 B1
(45) Date of Patent: Aug. 6, 2002

(54) OPTICAL NETWORK

(75) Inventors: Yoshihiko Suemura; Soichiro Araki; Akio Tajima; Seigo Takahashi; Yoshiharu Maeno; Naoya Henmi, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/218,102

(22) Filed: Dec. 22, 1998

(30) Foreign Application Priority Data

Dec. 22, 1997 (JP) .............................. 9-364791

(51) Int. Cl.$^7$ ............................... H04J 14/02
(52) U.S. Cl. ...................... 359/128; 359/117; 359/123
(58) Field of Search ................... 359/128, 117, 359/123

(56) References Cited

U.S. PATENT DOCUMENTS

| | | | | |
|---|---|---|---|---|
| 5,194,977 A | * | 3/1993 | Nishio ..................... | 359/128 |
| 5,450,224 A | * | 9/1995 | Johansson ................ | 359/128 |
| 5,703,707 A | * | 12/1997 | Dieudonne et al. ....... | 359/128 |
| 6,072,610 A | * | 6/2000 | Kuroyanagi et al. ...... | 359/117 |
| 6,243,178 B1 | * | 6/2001 | Suemura et al. ........... | 359/128 |
| 6,271,949 B1 | * | 8/2001 | Suemura et al. ........... | 359/128 |

FOREIGN PATENT DOCUMENTS

| | | |
|---|---|---|
| DE | 42 17 821 | 12/1993 |
| EP | 0 486 023 | 5/1992 |
| EP | 0 639 015 | 2/1995 |
| JP | 63-318833 | 12/1988 |
| JP | 06-350566 | 12/1994 |
| JP | 08-65241 | 3/1996 |
| JP | 8-79806 | 3/1996 |
| JP | 8-242208 | 9/1996 |
| JP | 9-153884 | 6/1997 |
| JP | 9-312630 | 12/1997 |
| JP | 10-177115 | 6/1998 |
| JP | 10-336108 | 12/1998 |
| JP | 11-18118 | 1/1999 |

OTHER PUBLICATIONS

Akiyama et al., "Photonic Switching System", *The Transactions of the Institute of Electronics, Information and Comm. Engineers*, vol. E74, No. 1., Jan., 1991, pp. 84–91.
Ishida et al., ", Parallel–optical–interconnecting multiwavelength star network (POIMS Net) for high–capacity switching", *Electronics Letters*, vol. 32, No. 19, Sep. 12, 1996, pp. 1804–1806.
Yuzo Yoshikuni, et al., "Evolution in Optical Devices for WDM Networks", *NTT R&D*, vol. 46, No. 7, Jul. 1997, pp. 663–668.

* cited by examiner

*Primary Examiner*—Leslie Pascal
*Assistant Examiner*—Hanh Phan
(74) *Attorney, Agent, or Firm*—Sughrue Mion, PLLC

(57) ABSTRACT

Disclosed is an optical network which has: wavelength tunable optical transmitters of number MN, where N is an integer of two or more, each of which outputs an optical signal with arbitrary one of M wavelengths $\lambda_1, \lambda_2, \ldots, \lambda_M$, where M is an integer of two or more, that are different from one another; a MN×N optical switch whose input ports are connected to the respective wavelength tunable optical transmitters of number MN, and which allows optical signals input to different input ports to be output form its same output port; 1×M optical wavelength demultiplexers of number N which output demultiplexing optical signal with wavelengths $\lambda_1, \lambda_2, \ldots, \lambda_M$ input from output ports of the MN×N optical switch into each wavelength; and optical receivers of number MN which receive optical signals input from the 1×M optical wavelength demultiplexers of number N.

9 Claims, 22 Drawing Sheets

OPTICAL NETWORK

FIELD OF THE INVENTION

This inventions relates to an optical network that is available for communication networks, such as public communications network, local area network, interconnection network of computers etc.

BACKGROUND OF THE INVENTION

Optical networks where optical signal is exchanged among multiple nodes using an optical switch etc. are expected as means to realize such a large capacity of network that cannot have been realized in conventional electrical networks. In a communication network, not applying only in optical network, it is typical that, to a transmit node, a destination address, i.e., the number of a receive node is given and the routing control is carried out based on the destination address. In an electrical network, the destination address is written in the header of packet at the transmit node, switches in the network can read this destination address and perform the routing control by itself.

However, in the case of optical network, it is not easy to perform the routing control by an optical switch itself because the logical operation of optical signal is difficult to conduct. So, in optical networks, it is typical that a controlled objective, such as an optical switch, is connected through a dedicated control line with a transmit node and the routing control is performed using it.

FIG. 1 shows an example of a conventional broadcast and select type of 4×4 optical network that uses wavelength division multiplexing (e.g., Biswanath Mukherjee, "WDM-Based Local Lightwave Networks Part I: Single-Hop Systems", IEEE Network, May 1992, pp. 12–27). Optical transmitters 5 at transmit nodes t0 to t3 transmit optical signals with different wavelengths $\lambda_0$ to $\lambda_3$, and these optical signals are wavelength-multiplexed by a star coupler 6 and distributed to four wavelength selectors 7. Each of the wavelength selectors 7 selects only optical signal with desired one wavelength from the four wavelengths and outputs it, and an optical receiver 4 at receive nodes r0 to r3 receives it. For the routing control, the respective transmit nodes t0 to t3 are connected through control lines (not shown) with all the wavelength selectors 7.

When, like this optical network, there are many controlled objectives for the respective transmit nodes and they are located on the receive node side, it is necessary to provide so long control lines. Therefore, in optical networks, it is desired that the controlled objectives be concentrated near the transmit nodes as close as possible.

Two examples of conventional optical networks where controlled objectives are concentrated close to transmit nodes are explained below.

The first example is a wavelength routing type of optical network shown in FIG. 2. Each node is provided with a wavelength tunable optical transmitter 1 that can output an optical signal with an arbitrary wavelength of wavelengths $\lambda_0$ to $\lambda_3$. A star coupler 6 couples the transmitted optical signal and distributes it. Each of optical filters 8-0 to 8-3 transmits only optical signal with wavelength $\lambda_0$ to $\lambda_3$ proper thereto, and an optical receiver 4 to each receive node r0 to r3 receives it. In this optical network, the wavelength of optical signal corresponds to a destination address by one—one relation. Therefore, the controlled objective of each transmit node is only its own wavelength tunable optical transmitter 1.

The second example is an optical network using optical switch shown in FIG. 3. An optical switch 9 switches and outputs an optical signal, thereby conducting the communication between an arbitrary transmit node and an arbitrary receive node. The optical switch 9 is a splitter/combiner type optical switch that has mesh interconnections between 1×4 optical switches 10 and optical combiners 11 (e.g., Maeno et al., IEICE 1996 General Meeting, SB-9-5). The 1×4 optical switch 10 is composed of an optical splitter 20 and optical gate switches 21 which are of semiconductor optical amplifiers. By turning on arbitrary one of the four optical gate switches and turning off the others, an optical signal input can be output from an arbitrary output port. In this optical network, the controlled objective of each transmit node is only one 1×4 optical switch 10. For example, a transmit node 5-0 can transmit a packet to an arbitrary receive node by controlling the optical gate switches 21-0 to 21-3.

The problems of the above conventional examples are described below.

Although, in the optical network of the first conventional example, wavelengths with the same number as the number of receive nodes are necessary, the number of wavelengths available is restricted by various factors. For example, when a wavelength tunable semiconductor laser is used as the wavelength tunable optical transmitter 1, the number of wavelengths available is restricted since the tuning range of the wavelength tunable semiconductor laser is limited. Also, when an optical amplifier is used in the optical network, the number of wavelengths available is restricted by the bandwidth of the optical amplifier. Therefore, in the optical network of the first conventional example, there is the problem that the number of nodes cannot be increased so much.

Also, in the optical network of the first conventional example, there is the problem that simultaneously transmitting a packet from one transmit node to multiple receive nodes, so called "multicast", cannot be conducted. When a broadcast type of services are performed on the network, it becomes necessary for a same packet to be sent from one transmit node to multiple receive nodes. For the network with no multicast function, a same packet needs to be one by one sequentially sent to multiple receive nodes, the transmit node is occupied during that period, therefore the transmit node cannot send out the next packet until the transmission of the same packet to all the receive nodes is completed. On the other hand, in the optical network of second conventional example, the multicast is available. For example, turning on the optical gate switches 21-0 to 21-2, the multicast from the transmit node t0 to the receive nodes r0, r1 and r3 can be performed. Since the transmit node can simultaneously send a same packet to multiple receive nodes, it can quickly make the transition to the next packet transferring. Thus, to enable the multicast is a key matter in building an optical network.

In the second example, the number of optical gate switches 21 needed to compose the optical switch 9 is the number of input and output ports to the second power. Therefore, when the number of input and output ports is increased, the scale of switch is increased, therefore causing serious problems that the cost is abruptly increased and that the implementation is very difficult to conduct. For example, 16 optical gate switches only are required for the optical switch 9 of 4×4, however 256 optical gate switches are required for 16×16 and 4096 optical gate switches are required for 64×64. Hence, to reduce the number of gate switches required is also a key matter.

SUMMARY OF THE INVENTION

Accordingly, it is an object of the invention to provide an optical network where the control objectives are concentrated close to transmit node and, furthermore, the routing control is very easy to conduct.

It is a further object of the invention to provide an optical network where similar scale to that of the conventional optical network can be provided by using reduced number of components.

It is a further object of the invention to provide an optical network with excellent modularity so called.

According to the invention, an optical network, comprises:

wavelength tunable optical transmitters of number MN, where N is an integer of two or more, each of which outputs an optical signal with arbitrary one of M wavelengths $\lambda_1, \lambda_2, \ldots, \lambda_M$, where M is an integer of two or more, that are different from one another;

a MN×N optical switch whose input ports are connected to said respective wavelength tunable optical transmitters of number MN, and which allows optical signals input to different input ports to be output from its same output port;

1×M optical wavelength demultiplexers of number N which output demultiplexing optical signal with wavelengths $\lambda_1, \lambda_2, \ldots, \lambda_M$ input from output ports of said MN×N optical switch into each wavelength; and optical receivers of number MN which receive optical signals input from said 1×M optical wavelength demultiplexers of number N.

According to another aspect of the invention, an optical network, comprises:

wavelength tunable optical transmitters of number MN, where N is an integer of two or more, each of which outputs an optical signal with arbitrary one of M wavelengths $\lambda_1, \lambda_2, \ldots, \lambda_M$, where M is an integer of two or more, that are different from one another;

N×N optical switch of number M whose input ports are connected to said respective wavelength tunable optical transmitters of number MN, and which allows optical signals input to different input ports to be output from its same output port;

M×1 optical combiners of number N which output combining optical signals input from each of said respective N×N optical switches of number M;

1×M optical wavelength demultiplexers of number N which output demultiplexing optical signal with wavelengths $\lambda_1, \lambda_2, \ldots, \lambda_M$ input from said M×1 optical wavelength multiplexer into each wavelength; and optical receivers of number MN which receive optical signals input from said 1×M optical wavelength demultiplexers of number N.

According to another aspect of the invention, an optical network, comprises:

wavelength tunable optical transmitters of number MN, where N is an integer of two or more, each of which outputs an optical signal with arbitrary one of M wavelengths $\lambda_0, \lambda_2, \ldots, \lambda_{(M-1)}$, where M is an integer of two or more, that are different from one another;

1×N optical switches of number MN whose input ports are connected to said respective wavelength tunable optical transmitters of number MN;

MN×M optical wavelength routers of number N which output demultiplexing optical signal with wavelengths $\lambda_0, \lambda_1, \ldots, \lambda_{(M-1)}$ input from said respective 1×N optical switches of number NM into each wavelength; and optical receivers of number MN which receive optical signals input from said MN×M optical wavelength routers of number N.

According to another aspect of the invention, an optical network, comprises:

wavelength tunable optical transmitters of number MN, where N is an integer of two or more, each of which outputs an optical signal with arbitrary one of M wavelengths $\lambda_0, \lambda_2, \ldots, \lambda_{(M-1)}$, where M is an integer of two or more, that are different from one another;

N×N optical switches of number M whose input ports are connected to said respective wavelength tunable optical transmitters of number MN, and which allows optical signals input to different input ports to be output from its same output port;

M×M optical wavelength routers of number N which output demultiplexing optical signal with wavelengths $\lambda_0, \lambda_1, \ldots, \lambda_{(M-1)}$ input from said respective N×N optical switches of number M into each wavelength; and optical receivers of number MN which receive optical signals input from said M×M optical wavelength routers of number N.

According to another aspect of the invention, an optical network, comprises:

wavelength tunable WDM optical transmitters of number MN, where N is an integer of two or more, each of which outputs an WDM optical signal of arbitrary one of M wavelength groups G0, G1, ..., G(M-1), where M is an integer of two or more, each of which is composed of L wavelengths, where L is an integer of two or more, and all wavelengths are different from one another;

a MN×N optical switch whose input ports are connected to said respective wavelength tunable WDM optical transmitters of number MN, and which allows WDM optical signals input to different input ports to be output from its same output port;

1×M optical wavelength demultiplexers of number N which output demultiplexing WDM optical signal of wavelength groups G0, G1, ..., G(M-1) input from output ports of said MN×N optical switch into each wavelength group; and WDM optical receivers of number MN which demultiplex WDM optical signal input from said 1×M optical wavelength demultiplexers of number N into optical signals with each wavelengths and receive these optical signals According to another aspect of the invention, an optical network, comprises:

wavelength tunable WDM optical transmitters of number MN, where N is an integer of two or more, each of which outputs an WDM optical signal of arbitrary one of M wavelength groups G0, G1, ..., G(M-1), where M is an integer of two or more, each of which is composed of L wavelengths, where L is an integer of two or more, and all wavelengths are different from one another;

N×N optical switches of number M whose input ports are connected to said respective wavelength tunable WDM optical transmitters of number MN, and which allows WDM optical signals input to different input ports to be output from its same output port;

M×1 optical combiners of number N which output combining WDM optical signals input from of said respective N×N optical switches of number M;

1×M optical wavelength demultiplexers of number N which output demultiplexing WDM optical signal of wavelength groups G0, G1, . . . , G(M−1) input from said M×1 optical wavelength multiplexer into each wavelength group; and WDM optical receivers of number MN which demultiplex WDM optical signal input from said 1×M optical wavelength demultiplexers of number N into optical signals with each wavelengths and receive these optical signals.

According to another aspect of the invention, an optical network, comprises:

wavelength tunable WDM optical transmitters of number MN, where N is an integer of two or more, each of which outputs an WDM optical signal of arbitrary one of M wavelength groups G0, G1, . . . , G(M−1), where M is an integer of two or more, each of which is composed of L wavelengths, where L is an integer of two or more, and all wavelengths are different from one another;

1×N optical switches of number MN whose input ports are connected to said respective wavelength tunable WDM optical transmitters of number MN;

MN×M optical wavelength routers of number N which output demultiplexing WDM optical signal of wavelength groups G0, G1, . . . , G(M−1) input from said respective 1×N optical switches of number NM into each wavelength group; and WDM optical receivers of number MN which demultiplex WDM optical signal input from said MN×M optical wavelength routers of number N into optical signals with each wavelengths and receive these optical signals.

According to another aspect of the invention, an optical network, comprises:

wavelength tunable WDM optical transmitters of number MN, where N is an integer of two or more, each of which outputs an WDM optical signal of arbitrary one of M wavelength groups G0, G1, . . . , G(M−1), where M is an integer of two or more, each of which is composed of L wavelengths, where L is an integer of two or more, and all wavelengths are different from one another;

N×N optical switches of number M whose input ports are connected to said respective wavelength tunable WDM optical transmitters of number MN, and which allows WDM optical signals input to different input ports to be output from its same output port;

M×M optical wavelength routers of number N which output demultiplexing WDM optical signal of wavelength groups G0, G1, . . . , G(M−1) input from said respective N×N optical switches of number M into each wavelength group; and WDM optical receivers of number MN which demultiplex WDM optical signal input from said M×M optical wavelength routers of number N into optical signals with each wavelengths and receive these optical signals.

BRIEF DESCRIPTION OF THE DRAWINGS

The invention will be explained in more detail in conjunction with the appended drawings, wherein.

DESCRIPTION OF THE PREFERRED EMBODIMENTS

[Embodiment 1]

Figure 4:
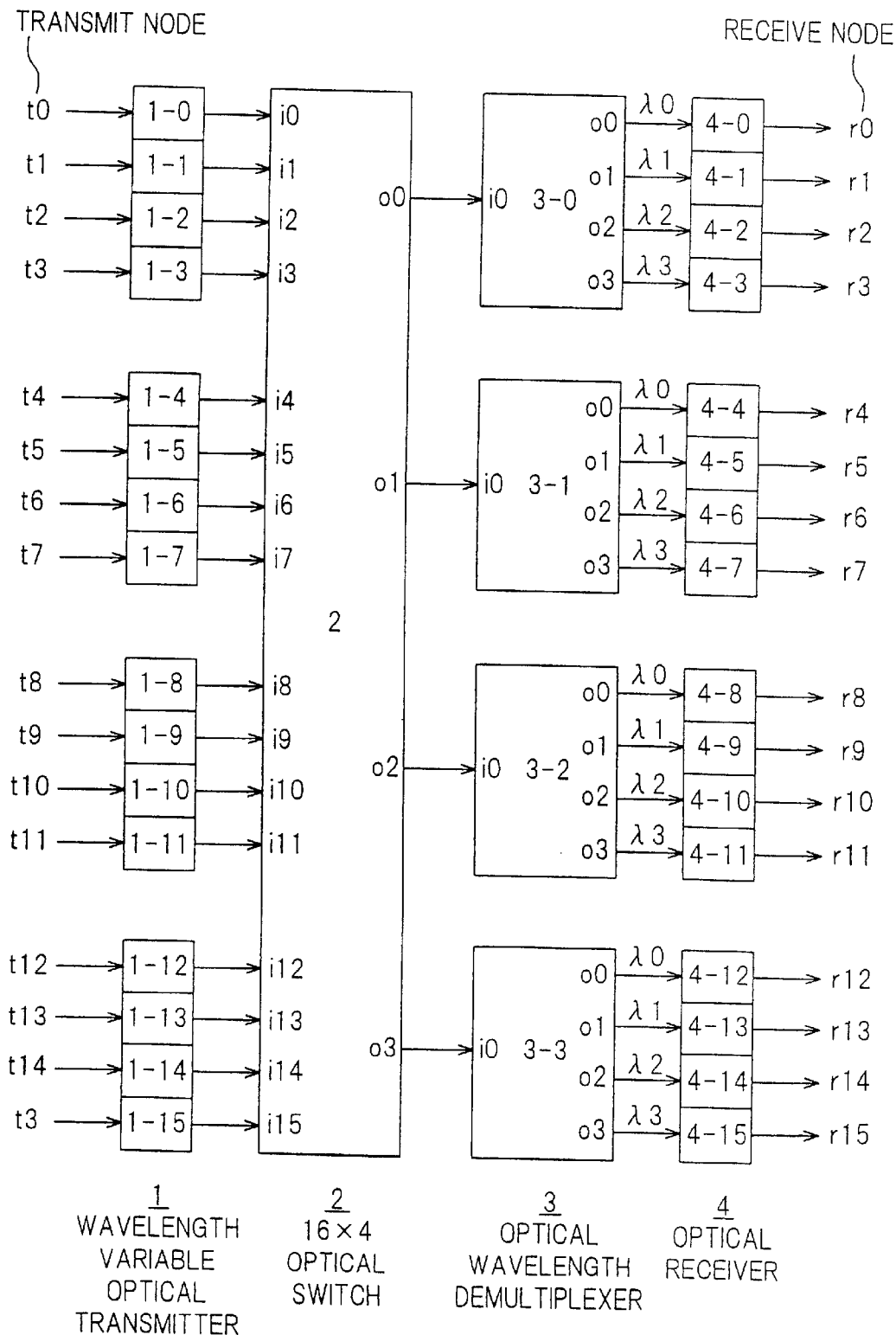
FIG. 4 is a block diagram showing the composition of an optical network in a first preferred embodiment according to the invention.

FIG. 4 shows the composition of the first preferred embodiment. The first embodiment is a 16×16 optical network that is defined by setting M=N=4. This optical network is composed of wavelength tunable optical transmitters 1, a 16×4 optical switch 2, optical wavelength demultiplexers 3, and optical receivers 4.

The wavelength tunable optical transmitters 1 are optical transmitters, each of which is composed of a combination of a wavelength tunable semiconductor laser and a electroabsorption modulator, and outputs converting an input electrical signal into an optical signal with an arbitrary wavelength of wavelengths $\lambda_0, \lambda_1, \lambda_2, \lambda_3$. The optical signal output from the wavelength tunable optical transmitter 1 is switched by the 16×4 optical switch 2, input to the optical wavelength demultiplexer 3. The optical wavelength demultiplexer 3 is an arrayed waveguide grating type optical wavelength demultiplexer composed of silica waveguides fabricated on a silicon substrate, where, when inputting a wavelength division multiplexed optical signal (hereinafter referred to as 'WDM optical signal') with wavelengths $\lambda_0, \lambda_1, \lambda_2, \lambda_3$ from input port i0, an optical signal with wavelength $\lambda_0$ is output from output port o0, an optical signal with wavelength $\lambda_1$ is output from output port o1, an optical signal with wavelength $\lambda_2$ is output from output port o2, and an optical signal with wavelength $\lambda_3$ is output from output port o3. The optical signal output from the optical wavelength demultiplexer 3 is converted into an electrical signal by the optical receiver 4.

Figure 5:
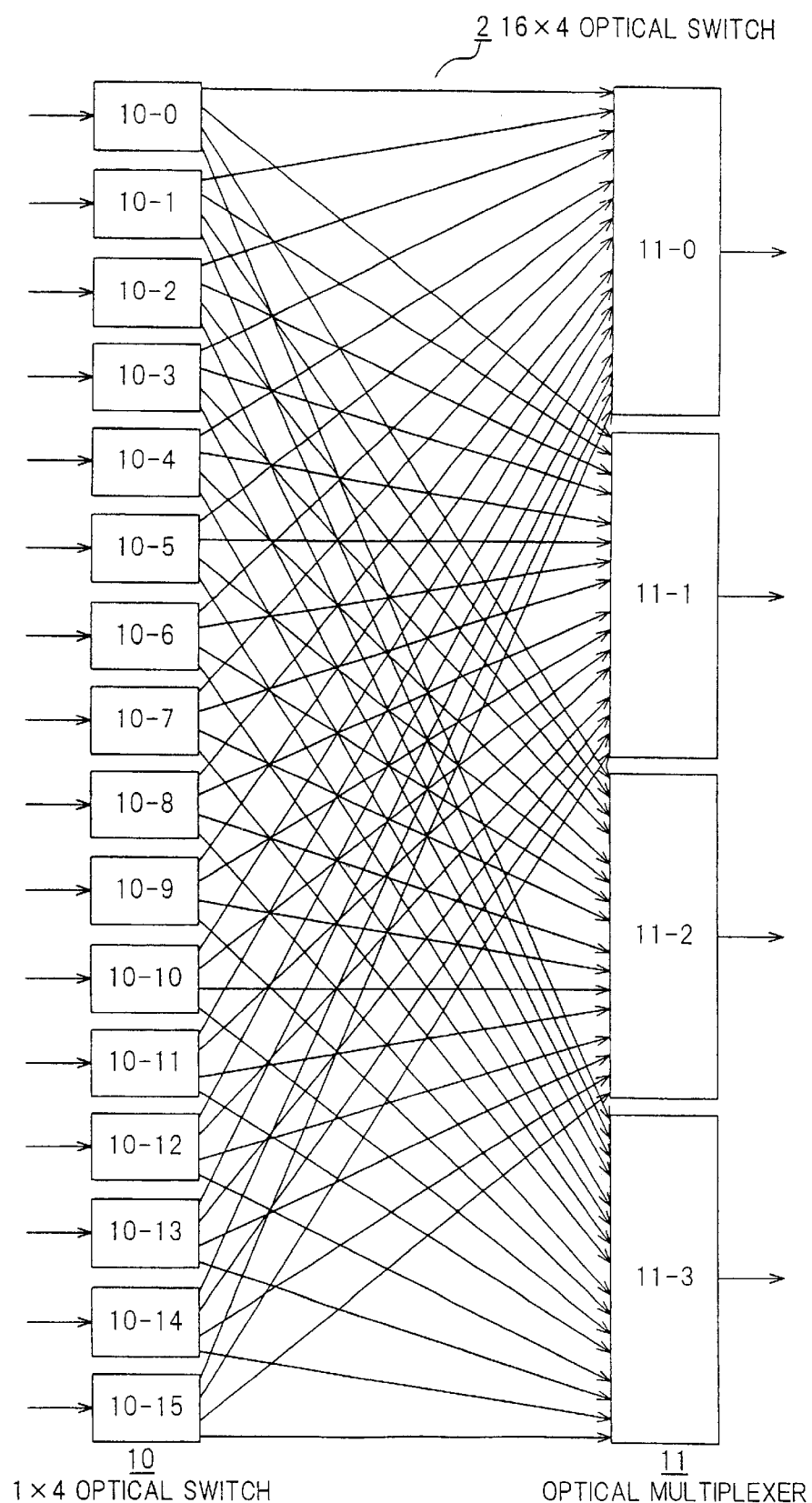
FIG. 5 is a block diagram showing the composition of a 16×4 optical switch 2 in the first embodiment.
Figure 6:
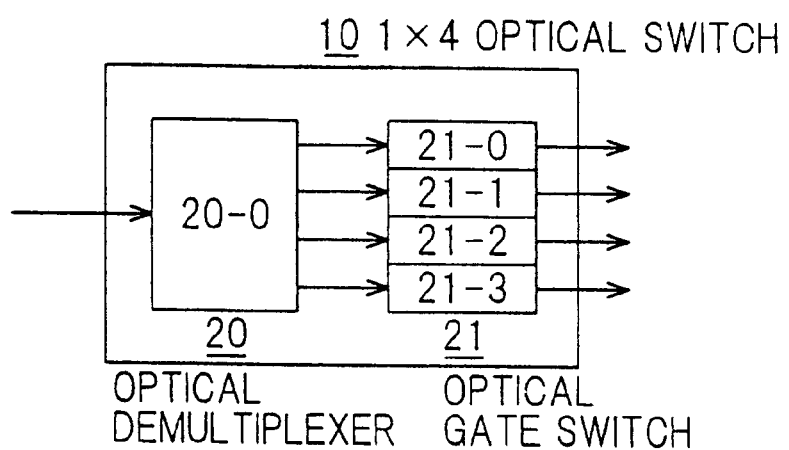
FIG. 6 is a block diagram showing the composition of a 1×4 optical switch 10 in the first embodiment.

As shown in FIG. 5, the 16×4 optical switch 2 is a splitter/combiner type optical switch composed of sixteen 1×4 optical switches 10 and four optical combiners 11. The 1×4 optical switch 10 is, as shown in FIG. 6, comprised of an optical splitter 20 and four optical gate switches 21. The optical gate switch 21 is a semiconductor optical amplifier, which, with supply of current, turns on to transmit optical signal and, with no supply of current, turns off to shut off optical signal. In the 1×4 optical switches 10, by turning on arbitrary one of the four optical gate switches 21, optical signal input from input port is output from arbitrary output port. Accordingly, the 16×4 optical switch 2 can multiplex several optical signals input from different input ports and output it from same output port.

Here, the operations of the optical network in this embodiment are explained, taking the case that the packet transfer from transmit node t0 to receive node r0 and the packet transfer from transmit node t4 to receive node r1 are performed at the same time. A packet transmitted from transmit node t0 is converted into optical signal with wavelength $\lambda_0$ by the wavelength tunable optical transmitter 1-0, input to input port i0 of the 16×4 optical switch 2. Similarly, a packet transmitted from transmit node t4 is converted into optical signal with wavelength $\lambda_1$ by the wavelength tunable optical transmitter 1-4, input to input port i4 of the 16×4 optical switch 2. In the 1×4 optical switches 10-0, 10-4 of the 16×4 optical switch 2, the optical gate switch 21-0 is turned on and the optical gate switches 21-1 to 21-3 are turned off. Thus, optical signal with wavelength $\lambda_0$ input to input port i0 of the 16×4 optical switch 2 and optical signal with wavelength $\lambda_1$ input to input port i4 are wavelength-multiplexed and output from output port o0. This WDM optical signal is demultiplexed into respective wavelengths by the optical wavelength demultiplexer 3-0, optical signal with wavelength $\lambda_0$ is output from output port o0 to the optical receiver 4-0 and optical signal with wavelength $\lambda_1$ is output from output port o1 to the optical receiver 4-1. By the above operations, the packet transfer from transmit node t0 to receive node r0 and the packet transfer from transmit node t4 to receive node r1 are performed at the same time.

The optical network in this embodiment is fully nonblocking, like the first and second conventional examples and is a so-called crossbar network that the packet transfer route from arbitrary transmit node to arbitrary receive node is determined uniquely.

In this embodiment, each transmit node only has to control its own wavelength tunable optical transmitter 1 and one 1×4 optical switch 10. For example, transmit node t0 can send packet to all receive nodes by controlling the wavelength tunable optical transmitter 1-0 and 1×4 optical switch 10-0. Therefore, the number of control line required is one between each transmit node and 1×4 optical switch 10, and is only 16 in total. Furthermore, the quotient obtained by dividing the number of receive node by 4 corresponds to the number of optical gate switch 21 to be turned on in the 1×4 optical switch 10, and its remainder corresponds to the number of transmission wavelength. Thus, the numbers of transmission wavelength and optical gate switch 21 to be turned on can be directly obtained from the number of receive node, therefore the routing control is very easy to conduct.

Also, the number of wavelengths needed in this embodiment is four, which is reduced to a fourth of the number of wavelengths, 16, needed in the case that a 16×16 optical network is built in such a composition as the first conventional example. On the other hand, the number of optical gate switches needed in the 16×4 optical switch 2 is 64, which is reduced to a fourth of the number of optical gate switches, 256, needed in the case that a 16×16 optical network is built in such a composition as the second conventional example.

In the optical network of this embodiment, since the 1×4 optical switch 10 is composed of the optical splitter 20 and four optical gate switches 21, by simultaneously turning on multiple optical gate switches 21 in one 1×4 optical switch 10, the multicast to receive nodes that are assigned with a same reception wavelength can be performed. For example, when the transmission wavelength of the wavelength tunable optical transmitter 1-0 is $\lambda_0$ and the optical gate switches 21-0 to 21-3 to one 1×4 optical switch 10-0 are all turned on, the one-to-four multicast from transmit node t0 to receive nodes r0, r4, r8 and r12 can be performed. In this way, when the transmission wavelength of the wavelength tunable optical transmitter 1 is $\lambda_0$ and multiple optical gate switches 21 in the 1×4 optical switch 10 to which its optical signal is input are turned on, the multicast from an arbitrary transmit node to multiple arbitrary ones of receive nodes r0, r4, r8 and r12 can be performed. In like manner, with the transmission wavelength of $\lambda_1$, the multicast from an arbitrary transmit node to multiple arbitrary ones of receive nodes r1, r5, r9 and r13 can be performed. With the transmission wavelength of $\lambda_2$, the multicast from an arbitrary transmit node to multiple arbitrary ones of receive nodes r2, r6, r10 and r14 can be performed. With the transmission wavelength of $\lambda_3$, the multicast from an arbitrary transmit node to multiple arbitrary ones of receive nodes r3, r7, r11 and r15 can be performed.

[Embodiment 2]

Figure 7:
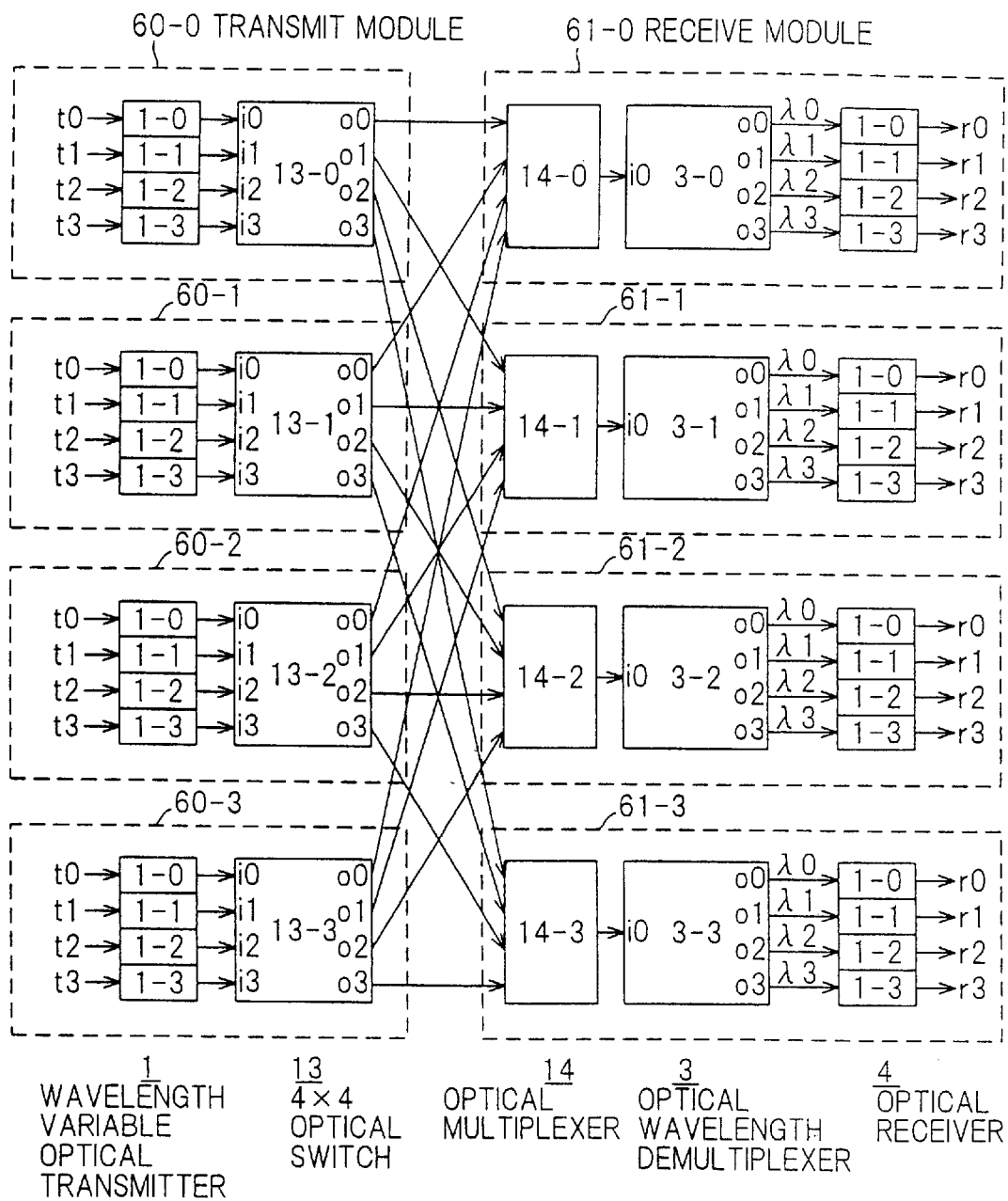
FIG. 7 is a block diagram showing the composition of an optical network in a second preferred embodiment according to the invention.

FIG. 7 shows the composition of the second preferred embodiment. The second embodiment is a 16×16 optical network that is defined by setting M=N=4. This optical network is composed of wavelength tunable optical transmitters 1, 4×4 optical switches 13, optical combiners 14, optical wavelength demultiplexers 3, and optical receivers 4.

Figure 8:
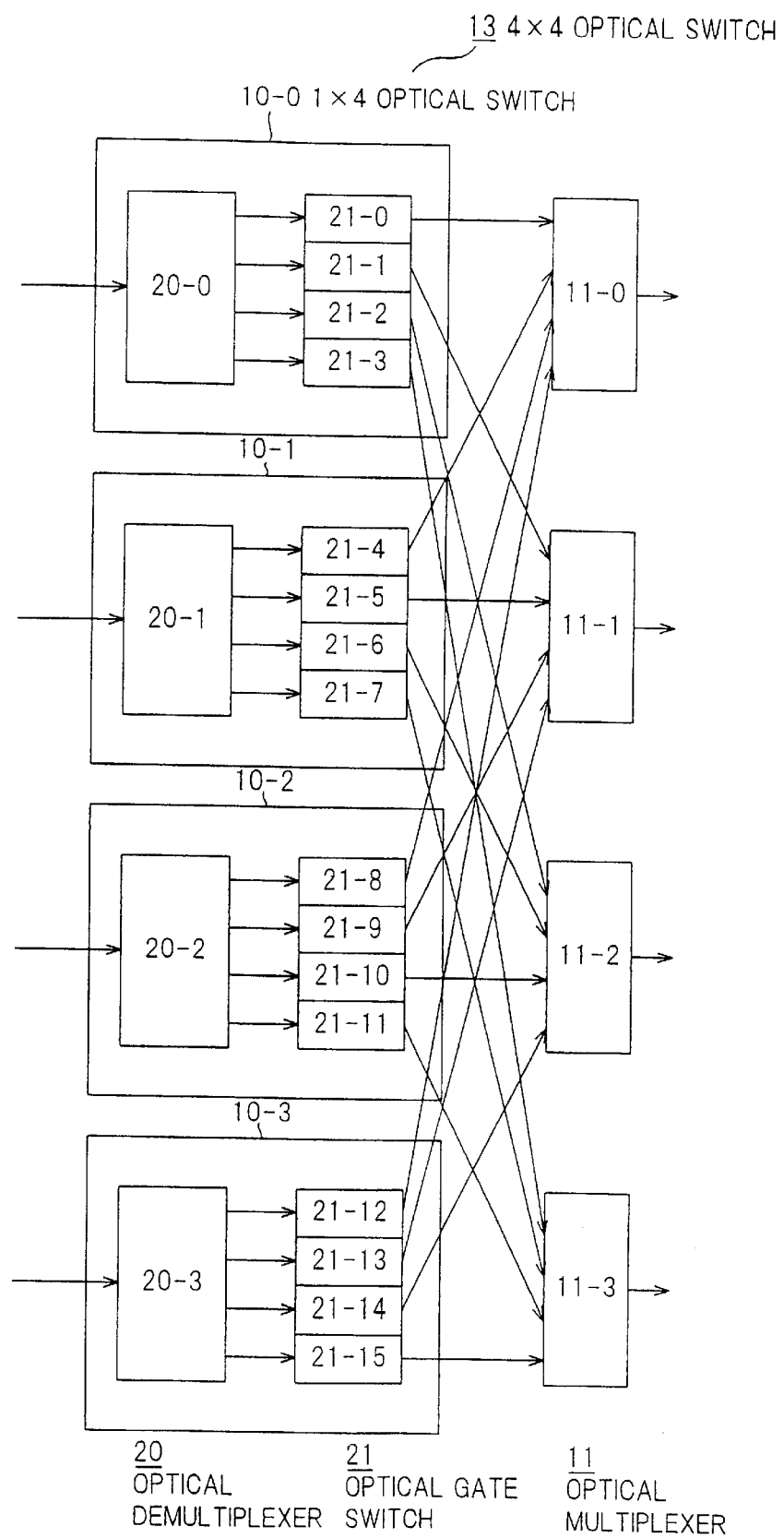
FIG. 8 is a block diagram showing the composition of a 4×4 optical switch 13 in the second embodiment.

As shown in FIG. 8, the 4×4 optical switch 13 is a splitter/combiner type optical switch composed of four 1×4 optical switches 10 and four optical combiners 11. The 1×4 optical switch 10 is composed of an optical splitter 20 and four optical gate switches 21.

In this embodiment, the 16×4 optical switch 2 in the first embodiment is replaced by four 4×4 optical switches 13 and four optical combiners 14. So, the four 4×4 optical switches 13 and four optical combiners 14 operates in the same manner as the 16×4 optical switch 2 of the first embodiment. Therefore, the optical network in this embodiment has the same effect as the optical network in the first embodiment.

Furthermore, comparing with the first embodiment, this embodiment has an advantage described below. The optical network of this embodiment, as shown in FIG. 7, can be modularized into a transmit module 60 composed of four wavelength tunable optical transmitters 1 and 4×4 optical switch 13, and a receive module 61 composed of the optical combiner 14, optical wavelength demultiplexer 3 and four optical receivers 4. Therefore, when it is desired that the number of nodes be increased, the network can be easily expanded by adding module. For example, an 8×8 optical network is originally constructed by transmit modules 60-0, 60-1 and receive modules 61-0, 61-1. After that, when the number of nodes is increased, it is expanded to 12×12 optical network by adding transmit module 60-2 and receive module 61-2. When the number of nodes is further increased, it is expanded to 16×16 optical network by adding transmit module 60-3 and receive module 61-3. As described above, the optical network in this embodiment has the excellent advantage, modularity.

Embodiment 3

Figure 9:
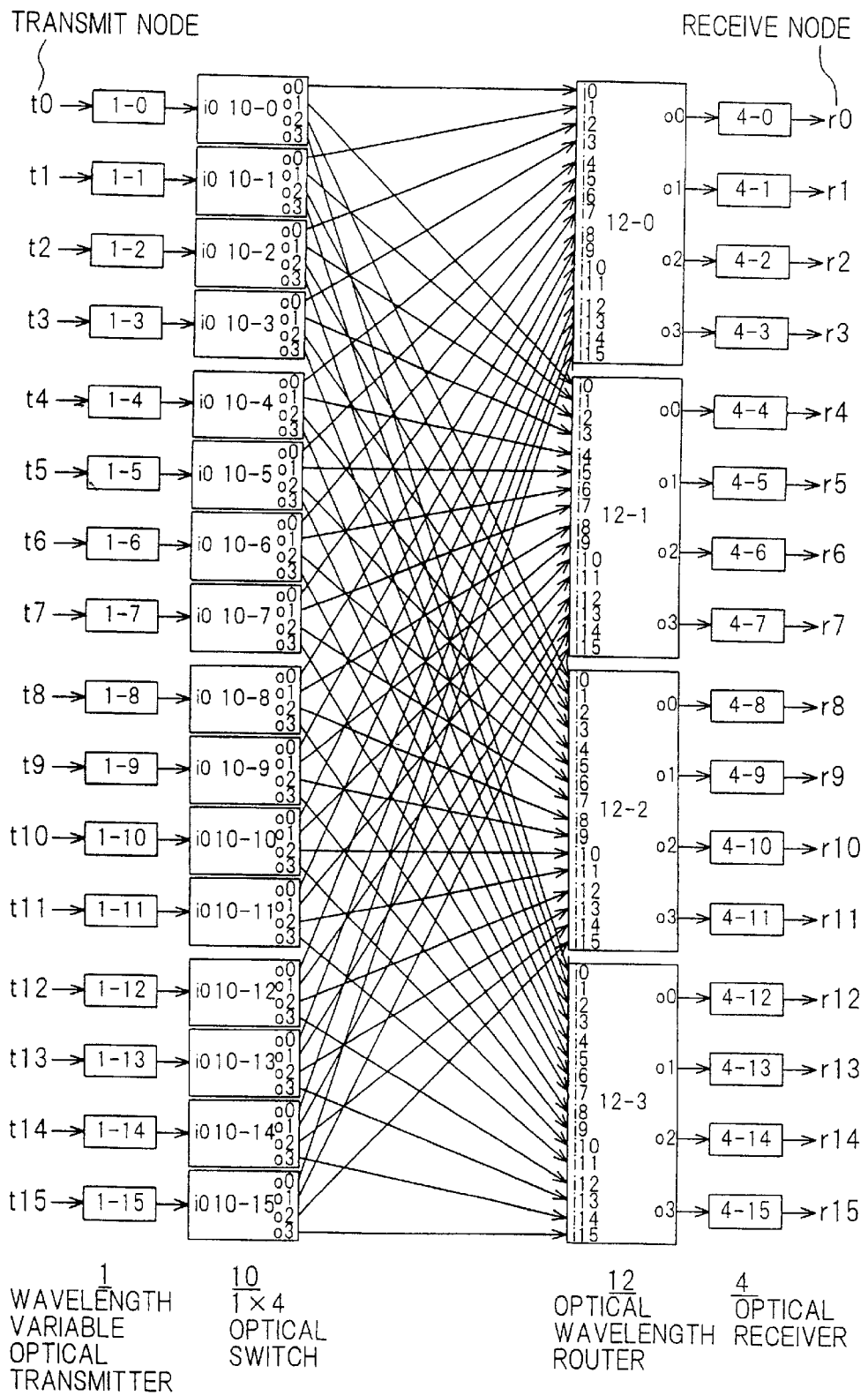
FIG. 9 is a block diagram showing the composition of an optical network in a third preferred embodiment according to the invention.

FIG. 9 shows the composition of the third preferred embodiment. The third embodiment is a 16×16 optical network that is defined by setting M=N=4. This optical network is composed of wavelength tunable optical transmitters 1, 1×4 optical switches 10, 16×4 optical wavelength routers 12, and optical receivers 4.

The wavelength tunable optical transmitters 1 are optical transmitters, each of which is composed of a combination of a wavelength tunable semiconductor laser and a electroabsorption modulator, and outputs converting an input electrical signal into an optical signal with an arbitrary wavelength of wavelengths $\lambda_0$, $\lambda_1$, $\lambda_2$, $\lambda_3$. The optical signal output from the wavelength tunable optical transmitter 1 is input to the 1×4 optical switch 10. The composition and operation of the 1×4 optical switch 10 in this embodiment are the same as those of the 1×4 optical switch 10 in the first embodiment shown in FIG. 6. An optical signal input to the input port can be output from an arbitrary output port. The optical signal output from the 1×4 optical switch 10 is input to the 16×4 optical wavelength router 12. The 16×4 optical wavelength router 12 demultiplexes optical signal with wavelengths $\lambda_0$, $\lambda_1$, $\lambda_2$, $\lambda_3$ to be input from an arbitrary input port into each wavelength signal, which is output from four output ports. The optical signal output from the 16×4 optical wavelength router 12 is converted into electrical signal by the optical receiver 4.

Figure 10:
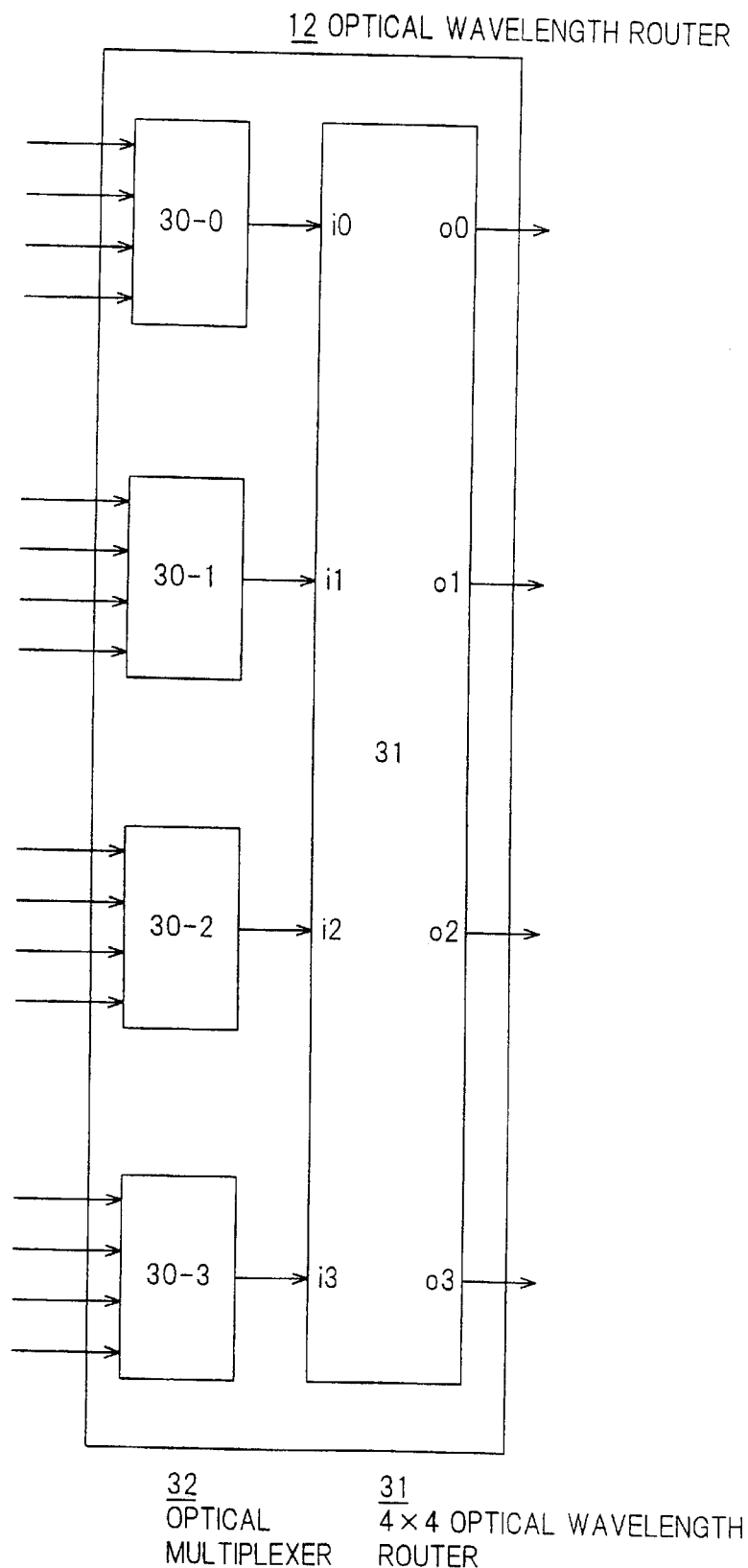
FIG. 10 is a block diagram showing the composition of a 16×4 optical wavelength router 12 in the third embodiment.

As shown in FIG. 10, the 16×4 optical wavelength router 12 is composed of four optical combiners 30 and a 4×4 optical wavelength router 31, and is a silica waveguide device fabricated on a silicon substrate. The 4×4 optical wavelength router 31 is an arrayed waveguide grating type optical wavelength router. The relationships between the input and output ports and the wavelength of transmitted optical signal in the 4×4 optical wavelength router 31 are as shown in Table 1.

TABLE 1

|  | Output port | | | |
| --- | --- | --- | --- | --- |
|  | o0 | o1 | o2 | o3 |
| Input port i0 | $\lambda_0$ | $\lambda_1$ | $\lambda_2$ | $\lambda_3$ |
| i1 | $\lambda_1$ | $\lambda_2$ | $\lambda_3$ | $\lambda_0$ |
| i2 | $\lambda_2$ | $\lambda_3$ | $\lambda_0$ | $\lambda_1$ |
| i3 | $\lambda_3$ | $\lambda_0$ | $\lambda_1$ | $\lambda_2$ |

Here, the operations of the optical network in this embodiment are explained, taking the case that the packet transfer from transmit node t0 to receive node r0 and the packet transfer from transmit node t4 to receive node r1 are performed at the same time. A packet transmitted from transmit node t0 is converted into optical signal with wavelength $\lambda_0$ by the wavelength tunable optical transmitter 1-0, input to the 1×4 optical switch 10-0. Similarly, a packet transmitted from transmit node t4 is converted into optical signal with wavelength $\lambda_2$ by the wavelength tunable optical transmitter 1-4, input to the 1×4 optical switch 10-4. In the 1×4 optical switches 10-0, 10-4, the optical gate switch 21-0 is turned on and the optical gate switches 21-1 to 21-3 are turned off. Thus, optical signal with wavelength $\lambda_0$ input to the 1×4 optical switch 10-0 is input to input port i0 of the 16×4 optical wavelength router 12-0, optical signal with wavelength $\lambda_2$ input to the 1×4 optical switch 10-4 is input to input port i4 of the 16×4 optical wavelength router 12-0. The optical signal with wavelength $\lambda_0$ input to input port i0 of the 16×4 optical wavelength router 12-0 is input through optical combiner 30-0 to input port i0 of the 4×4 optical wavelength router 31. Also, the optical signal with wavelength $\lambda_2$ input to input port i4 of the 16×4 optical wavelength router 12-0 is input through optical combiner 30-1 to input port i1 of the 4×4 optical wavelength route 31. According to Table 1, the optical signal with wavelength $\lambda_0$ input to input port i0 of the 16×4 optical wavelength router 12-0 is input to input port i0 of the 16×4 optical wavelength router 12, output from its output port o0, converted into electrical signal by the optical receiver 4-0. On the other hand, also according to Table 1, the optical signal with wavelength $\lambda_2$ input to input port i4 of the 16×4 optical wavelength router 12-0 is output from output port o1 of the 16×4 optical wavelength router 12-0, converted into electrical signal by the optical receiver 4-1. By the above operations, the packet transfer from transmit node t0 to receive node r0 and the packet transfer from transmit node t4 to receive node r1 are performed at the same time.

The optical network in this embodiment is a crossbar network, like the first and second conventional examples.

In this embodiment, each transmit node only has to control its own wavelength tunable optical transmitter 1 and one 1×4 optical switch 10. For example, transmit node t0 can send packet to all receive nodes by controlling the wavelength tunable optical transmitter 1-0 and 1×4 optical switch 10-0. Therefore, the number of control line required is one between each transmit node and 1×4 optical switch 10, and is only 16 in total. Furthermore, the numbers of transmission wavelength and optical gate switch 21 to be turned on can be directly obtained from the number of receive node, therefore the routing control is very easy to conduct.

Also, the number of wavelengths needed in this embodiment is four, which is reduced to a fourth of the number of wavelengths, 16, needed in the case that a 16×16 optical network is built in such a composition as the first conventional example. On the other hand, the number of optical gate switches needed in the 1×4 optical switch 10 is 64, which is reduced to a fourth of the number of optical gate switches, 256, needed in the case that a 16×16 optical network is built in such a composition as the second conventional example.

In the first embodiment, a theoretical optical loss of 12 dB occurs in the optical combiner 11. On the other hand, in this embodiment, a theoretical optical loss in the optical combiner 30 of the 16×4 optical wavelength router 12 is 6 dB. Since the optical loss in the optical wavelength demultiplexer 3 of the first embodiment is equal to that in the 4×4 optical wavelength router 31 of this embodiment, the received optical power of the optical receiver 4 in this embodiment is increased by 6 dB, compared with that in the first embodiment.

The 16×4 optical wavelength router 12 in this embodiment is composed of the 4×1 optical combiner 30 and 4×4 optical wavelength router 31 that are commercially available. So, not needing an asymmetrical particular device such as a 16×4 arrayed waveguide grating type optical router, it has a lower cost.

In the optical network of this embodiment, since the 1×4 optical switch 10 is composed of the optical splitter 20 and four optical gate switches 21 as shown in FIG. 6, by simultaneously turning on multiple optical gate switches 21 in one 1×4 optical switch 10, the multicast to receive nodes that are assigned with a same reception wavelength can be performed. In the same manner as described in the first embodiment, the multicast from an arbitrary transmit node to multiple arbitrary ones of receive nodes r0, r4, r8 and r12, the multicast from an arbitrary transmit node to multiple arbitrary ones of receive nodes r1, r5, r9 and r13, the multicast from an arbitrary transmit node to multiple arbitrary ones of the receive nodes r2, r6, r10 and r14, and the multicast from an arbitrary transmit node to multiple arbitrary ones of receive nodes r3, r7, r11 and r15 can be performed. However, since the transmission characteristic of the 4×4 optical wavelength router 31 is as shown in Table 1, depending on transmit node to send packet, the correspondences between the transmission wavelength and the group of receive nodes to be multicast are varied. For example, when the transmission wavelength of the wavelength tunable optical transmitter 1-0 in transmit node t0 is $\lambda 0$ and the optical gate switches 21-0 to 21-3 in the 1×4 optical switch 10-0 are all turned on, the transmitted packet is multicast to receive nodes r0, r4, r8 and r12. However, when the transmission wavelength of the wavelength tunable optical transmitter 1-4 in transmit node t4 is $\lambda 0$ and the optical gate switches 21-0 to 21-3 in the 1×4 optical switch 10-4 are all turned on, the transmitted packet is multicast to receive nodes r3, r7, r11 and r15.

[Embodiment 4]

Figure 11:
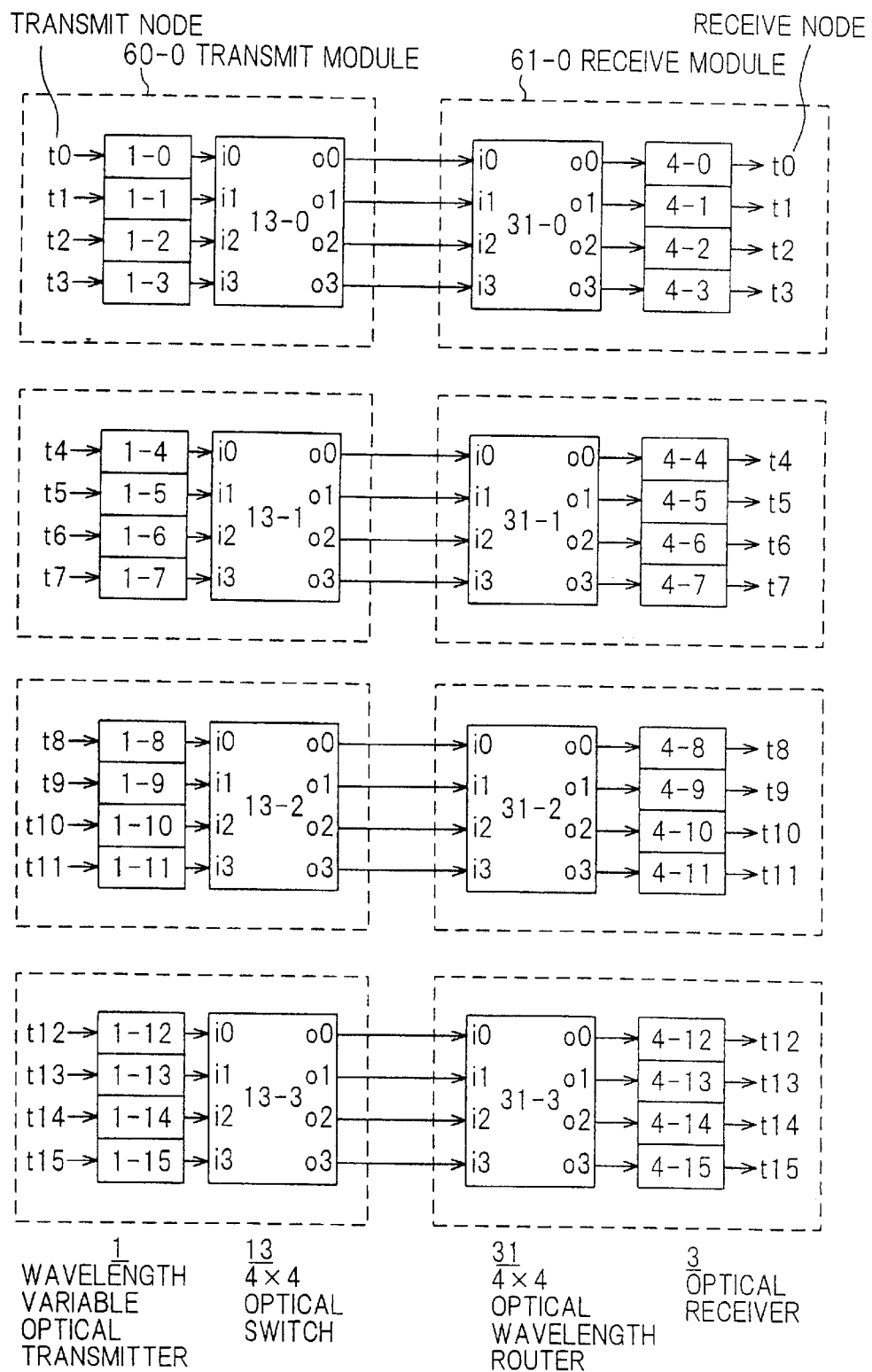
FIG. 11 is a block diagram showing the composition of an optical network in a fourth preferred embodiment according to the invention.

FIG. 11 shows the composition of the fourth preferred embodiment. The fourth embodiment is a 16×16 optical network that is defined by setting M=N=4. This optical network is composed of wavelength tunable optical transmitters 1, 4×4 optical switches 13, 4×4 optical wavelength routers 31, and optical receivers 4.

The composition and operation of the wavelength tunable optical transmitters 1, 4×4 optical wavelength routers 31, and optical receivers 4 in this embodiment are the same as those in the third embodiment. Also, the composition and operation of the 4×4 optical switch 13 are the same as those in the third embodiment.

Here, the operations of the optical network in this embodiment are explained, taking the case that the packet transfer from transmit node t0 to receive node r0 and the packet transfer from transmit node t4 to receive node r1 are performed at the same time. A packet transmitted from transmit node t0 is converted into optical signal with wavelength $\lambda 0$ by the wavelength tunable optical transmitter 1-0, input to input port i0 of the 4×4 optical switch 13-0. Similarly, a packet transmitted from transmit node t4 is converted into optical signal with wavelength $\lambda 2$ by the wavelength tunable optical transmitter 1-4, input to input port i0 of the 4×4 optical switch 13-1. In the 4×4 optical switches 13-0, 13-1, the optical gate switch 21-0 is turned on and the optical gate switches 21-1 to 21-3 are turned off. Thus, optical signal with wavelength $\lambda 0$ input to the 4×4 optical switch 13-0 is input to input port i0 of the 4×4 optical wavelength router 31-0, optical signal with wavelength $\lambda 2$ input to the 4×4 optical switch 13-1 is input to input port i1 of the 4×4 optical wavelength router 31-0. The 4×4 optical switch 13-0 operates like that of the second embodiment. According to Table 1, the optical signal with wavelength $\lambda 0$ input to input port i0 of the 4×4 optical wavelength router 31-0 is output from its output port o0, converted into electrical signal by the optical receiver 4-0. On the other hand, the optical signal with wavelength $\lambda 2$ input to input port i1 of the 4×4 optical wavelength router 31-0 is output from its output port o1, converted into electrical signal by the optical receiver 4-1. By the above operations, the packet transfer from transmit node t0 to receive node r0 and the packet transfer from transmit node t4 to receive node r1 are performed at the same time.

The optical network in this embodiment is a crossbar network, like the first and second conventional examples.

In this embodiment, each transmit node only has to control its own wavelength tunable optical transmitter 1 and one 1×4 optical switch 10. For example, transmit node t0 can send packet to all receive nodes by controlling the wavelength tunable optical transmitter 1-0 and 1×4 optical switch 10-0 in the 4×4 optical switch 13-0. Therefore, the number of control line required is one between each transmit node and 1×4 optical switch 10, and is only 16 in total. Furthermore, the numbers of transmission wavelength and optical gate switch 21 to be turned on can be directly obtained from the number of receive node, therefore the routing control is very easy to conduct.

Also, the number of wavelengths needed in this embodiment is four, which is reduced to a fourth of the number of wavelengths, 16, needed in the case that a 16×16 optical network is built in such a composition as the first conventional example. On the other hand, the number of optical gate switches needed in the 4×4 optical switch 13 is 64, which is reduced to a fourth of the number of optical gate switches, 256, needed in the case that a 16×16 optical network is built in such a composition as the second conventional example.

Although, in the second embodiment, a theoretical optical loss of 6 dB occurs in the optical combiner 14, in this embodiment, this optical loss does not occur. Since the optical loss in the optical wavelength demultiplexer 3 of the second embodiment is equal to that in the 4×4 optical wavelength router 31 of this embodiment, the received optical power of the optical receivers 4 in this embodiment is increased by 6 dB, compared with that in the second embodiment.

The optical network of this embodiment, as shown in FIG. 11, can be modularized into a transmit module 60 composed of four wavelength tunable optical transmitters 1 and 4×4 optical switch 13, and a receive module 61 composed of 4×4 optical wavelength router 31 and four optical receivers 4. Therefore, when it is desired that the number of nodes be increased, the network can be easily expanded by adding module. For example, an 8×8 optical network is originally constructed by transmit modules 60-0, 60-1 and receive modules 61-0, 61-1. After that, when the number of nodes is increased, it is expanded to 12×12 optical network by adding transmit module 60-2 and receive module 61-2. When the number of nodes is further increased, it is expanded to 16×16 optical network by adding transmit module 60-3 and receive module 61-3. As described above, the optical network in this embodiment has the excellent advantage, modularity.

In the optical network of this embodiment, since the 1×4 optical switch 10 in the 4×4 optical switch 13 is composed of the optical splitter 20 and four optical gate switches 21 as shown in FIG. 8, by simultaneously turning on multiple optical gate switches 21 in one 1×4 optical switch 10, the multicast to receive nodes that are assigned with a same reception wavelength can be performed. In the same manner as described in the third embodiment, the multicast from an arbitrary transmit node to multiple arbitrary ones of receive nodes r0, r4, r8 and r12, the multicast from an arbitrary transmit node to multiple arbitrary ones of receive nodes r1, r5, r9 and r13, the multicast from an arbitrary transmit node to multiple arbitrary ones of receive nodes r2, r6, r10 and r14, and the multicast from an arbitrary transmit node to multiple arbitrary ones of receive nodes r3, r7, r11 and r15 can be performed.

[Embodiment 5]

Figure 12:
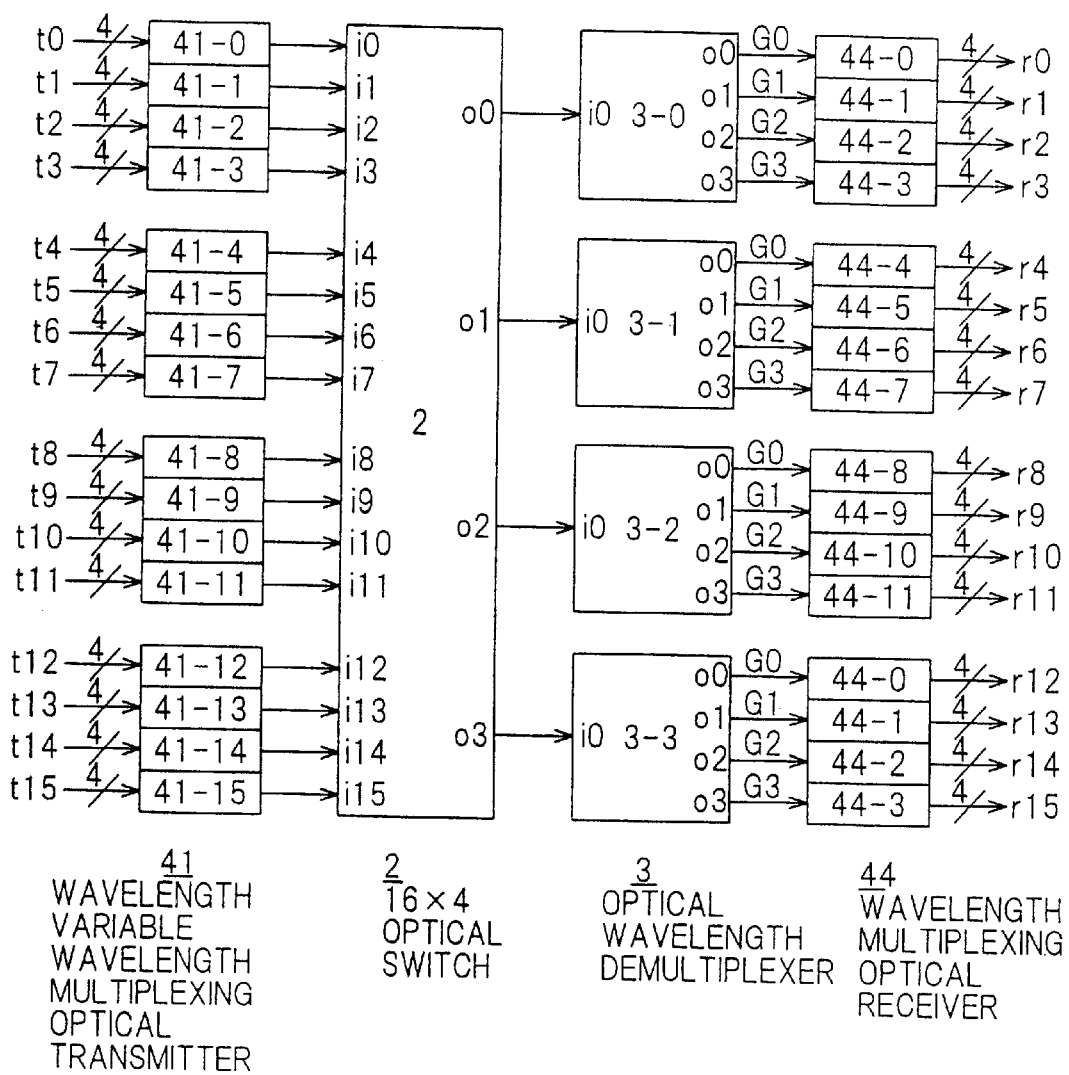
FIG. 12 is a block diagram showing the composition of an optical network in a fifth preferred embodiment according to the invention.

FIG. 12 shows the composition of the fifth preferred embodiment. The fifth embodiment is a 16×16 optical network that is defined by setting L=M=N=4. This optical network is composed of wavelength tunable WDM optical transmitters 41, 16×4 optical switch 2, optical wavelength demultiplexers 3, and WDM optical receivers 44.

In this embodiment, wavelengths $\lambda 0$, $\lambda 1$, $\lambda 2$, $\lambda 3$ are defined as wavelength group G0, wavelengths $\lambda 4$, $\lambda 5$, $\lambda 6$, $\lambda 7$ are defined as wavelength group G1, wavelengths $\lambda 8$, $\lambda 9$, $\lambda 10$, $\lambda 11$ are defined as wavelength group G2, and wavelengths $\lambda 12$, $\lambda 13$, $\lambda 14$, $\lambda 15$ are defined as wavelength group G3.

Figure 13:
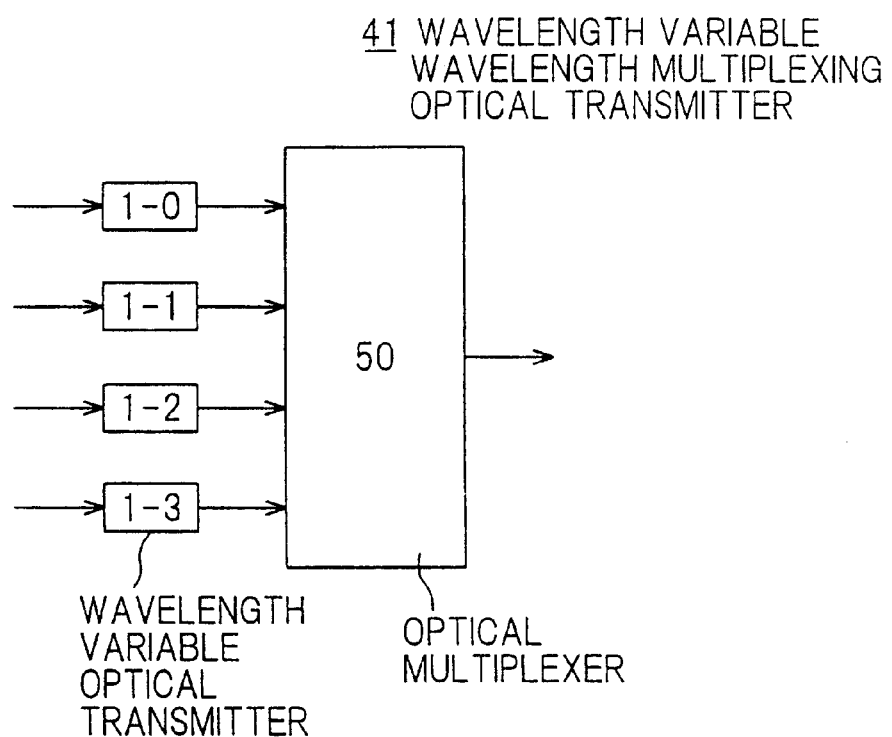
FIG. 13 is a block diagram showing the composition of a wavelength tunable WDM optical transmitter 41 in the fifth embodiment.

The wavelength tunable WDM optical transmitter 41 outputs converting a 4-bit wide electrical signal into a WDM optical signal with an arbitrary wavelength group of wavelength groups G0, G1, G2 and G3. The wavelength tunable WDM optical transmitter 41 is, as shown in FIG. 13, composed of four wavelength tunable optical transmitters 1 and an optical combiner 50. The wavelength tunable optical transmitter 1 is an optical transmitter that a wavelength tunable semiconductor laser and an electroabsorption modulator are combined, and it can output an optical signal with an arbitrary one of wavelengths $\lambda 0$ to $\lambda 15$.

The WDM optical signal output from the wavelength tunable WDM optical transmitter 41 is switched by the 16×4 optical switch 2, input to the optical wavelength demultiplexer 3. The optical wavelength demultiplexer 3 is an arrayed waveguide grating type optical wavelength demultiplexer composed of silica waveguides fabricated on a silicon substrate, where, when inputting a WDM optical signal with wavelengths $\lambda 0$ to $\lambda 15$ from input port i0, a WDM optical signal of wavelength group G0 is output from output port o0, a WDM optical signal of wavelength group G1 is output from output port o1, a WDM optical signal of wavelength group G2 is output from output port o2, and a WDM optical signal of wavelength group G3 is output from output port o3. The WDM optical signal output from the optical wavelength demultiplexer 3 is converted into a 4-bit wide electrical signal by the WDM optical receivers 44.

Figure 14:
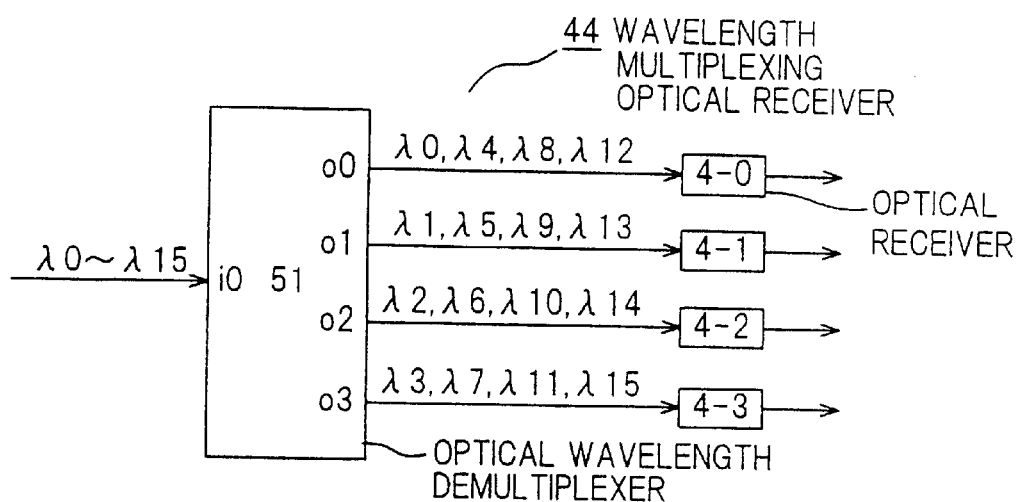
FIG. 14 is a block diagram showing the composition of a WDM optical receiver 44 in the fifth embodiment.

As shown in FIG. 14, the WDM optical receiver 44 is composed of an optical wavelength demultiplexer 51 and four optical receivers 4. The optical wavelength demultiplexer 51 is an arrayed waveguide grating type silica waveguide device formed on a silicon substrate, and demultiplexes WDM optical signal of each wavelength group into each wavelength signal. By equalizing the free spectral range of arrayed waveguide grating to the interval of wavelength groups, when WDM optical signal with wavelengths $\lambda 0$ to $\lambda 15$ is input from input port 10, WDM optical signal with wavelengths $\lambda 0$, $\lambda 4$, $\lambda 8$, $\lambda 12$ is output from output port o0, WDM optical signal with wavelengths $\lambda 1$, $\lambda 5$, $\lambda 9$, $\lambda 13$ is output from output port o1, WDM optical signal with wavelengths $\lambda 2$, $\lambda 6$, $\lambda 10$, $\lambda 14$ is output from output port o2, and WDM optical signal with wavelengths $\lambda 3$, $\lambda 7$, $\lambda 11$, $\lambda 15$ is output from output port o3. In this way, when WDM optical signal of wavelength group G0 is, for example, input to the WDM optical receivers 44, this WDM optical signal is demultiplexed into each wavelength signal, optical signal with wavelengths $\lambda 0$, $\lambda 1$, $\lambda 2$ and $\lambda 3$ each is converted into electrical signal by the optical receivers 4-0, 4-1, 4-2 and 4-3, respectively. In like manner, when WDM optical signal of wavelength groups G1, G2 and G3 each is input thereto, the WDM optical signal is demultiplexed into each wavelength signal, received by the optical receivers 4-0, 4-1, 4-2 and 4-3, respectively.

The composition and operation of the 16×4 optical switch 2 in this embodiment are the same as those of the 16×4 optical switch 2 in the first embodiment.

Here, the operations of the optical network in this embodiment are explained, taking the case that the packet transfer from transmit node t0 to receive node r0 and the packet transfer from transmit node t4 to receive node r1 are performed at the same time. A 4-bit wide packet transmitted from transmit node t0 is converted into WDM optical signal of wavelength group G0 by the wavelength tunable WDM optical transmitter 41-0, input to input port i0 of the 16×4 optical switch 2. Similarly, a 4-bit wide packet transmitted from transmit node t4 is converted into WDM optical signal of wavelength group G1 by the wavelength tunable WDM optical transmitter 41-4, input to input port i4 of the 16×4 optical switch 2 that is composed as shown in FIGS. 5 and 6. In the 1×4 optical switches 10-0, 10-4 of the 16×4 optical switch 2, the optical gate switch 21-0 is turned on and the optical gate switches 21-1 to 21-3 are turned off. Thus, the WDM optical signal of wavelength group G0 input to input port i0 of the 16×4 optical switch 2 and the WDM optical signal of wavelength group G1 input to input port i4 are further multiplexed, output from output port o0. This further WDM optical signal is demultiplexed into each wavelength group by the optical wavelength demultiplexer 3-0, the WDM optical signal of wavelength group G0 is output from its output port o0 to the WDM optical receiver 44-0, the WDM optical signal of wavelength group G1 is output from its output port o1 to the WDM optical receiver 44-1. The WDM optical signal of wavelength group G0 input to the WDM optical receiver 44-0, and the WDM optical signal of wavelength group G1 input to the WDM optical receiver 44-1 each are demultiplexed into each wavelength signal, converted into 4-bit wide electrical signal. By the above operations, the packet transfer from transmit node t0 to receive node r0 and the packet transfer from transmit node t4 to receive node r1 are performed at the same time.

The optical network in this embodiment is a crossbar network, like the first and second conventional examples.

In this embodiment, each transmit node only has to control its own wavelength tunable WDM optical transmitter 41 and one 1×4 optical switch 10. For example, transmit node t0 can send packet to all receive nodes by controlling transmission wavelength group in the wavelength tunable WDM optical transmitter 41-0, and the 1×4 optical switch 10-0 in the 16×4 optical switch 2. Therefore, the number of control line required is one between each transmit node and 1×4 optical switch 10, and is only 16 in total. Furthermore, the numbers of transmission wavelength group and optical gate switch 21 to be turned on can be directly obtained form the number of receive node, therefore the routing control is very easy to conduct.

In this embodiment, as transmission wavelength and reception wavelength, each, per one node, four wavelengths are assigned. Therefore, comparing with the first embodiment, when bit rate per one wavelength is equal, the throughput per one node is increased four times.

Also, the number of wavelengths needed in this embodiment is sixteen, which is reduced to a fourth of the number of wavelengths, 64, needed in the case that the throughput similar to that in this embodiment is realized in such a composition as the first conventional example, i.e., in the case that a 16×16 optical network is built assigning four wavelengths to one node. On the other hand, the number of optical gate switches needed in the 16×4 optical switch 2 is 64, like the case of the first embodiment, which is reduced to a fourth of the number of optical gate switches, 256, needed in the case that a 16×16 optical network is built in such a composition as the second conventional example.

In the optical network of this embodiment, since the 1×4 optical switch 10 in the 16×4 optical switch 2 is composed of the optical splitter 20 and four optical gate switches 21 as shown in FIG. 6, by simultaneously turning on multiple optical gate switches 21 in one 1×4 optical switch 10, the multicast to receive nodes that are assigned with a same reception wavelength can be performed. For example, when the transmission wavelength group of the wavelength tunable WDM optical transmitter 41-0 is G0 and the optical gate switches 21-0 to 21-3 of one 1×4 optical switch 10-0 are all turned on, the one-to-four multicast from transmit node t0 to receive nodes r0, r4, r8 and r12 can be performed. In this way, when the transmission wavelength group of the wavelength tunable WDM optical transmitters 41 is G0 and multiple optical gate switches 21 in the 1×4 optical switch 10 to which its WDM optical signal is input are turned on, the multicast from an arbitrary transmit node to multiple arbitrary ones of receive nodes r0, r4, r8 and r12 can be performed. In like manner, with the transmission wavelength group of G1, the multicast from an arbitrary transmit node to multiple arbitrary ones of receive nodes r1, r5, r9 and r13 can be performed. With the transmission wavelength group of G2, the multicast from an arbitrary transmit node to multiple arbitrary ones of receive nodes r2, r6, r10 and r14 can be performed. With the transmission wavelength group of G3, the multicast from an arbitrary transmit node to multiple arbitrary ones of receive nodes r3, r7, r11 and r15 can be performed.

[Embodiment 6]

Figure 15:
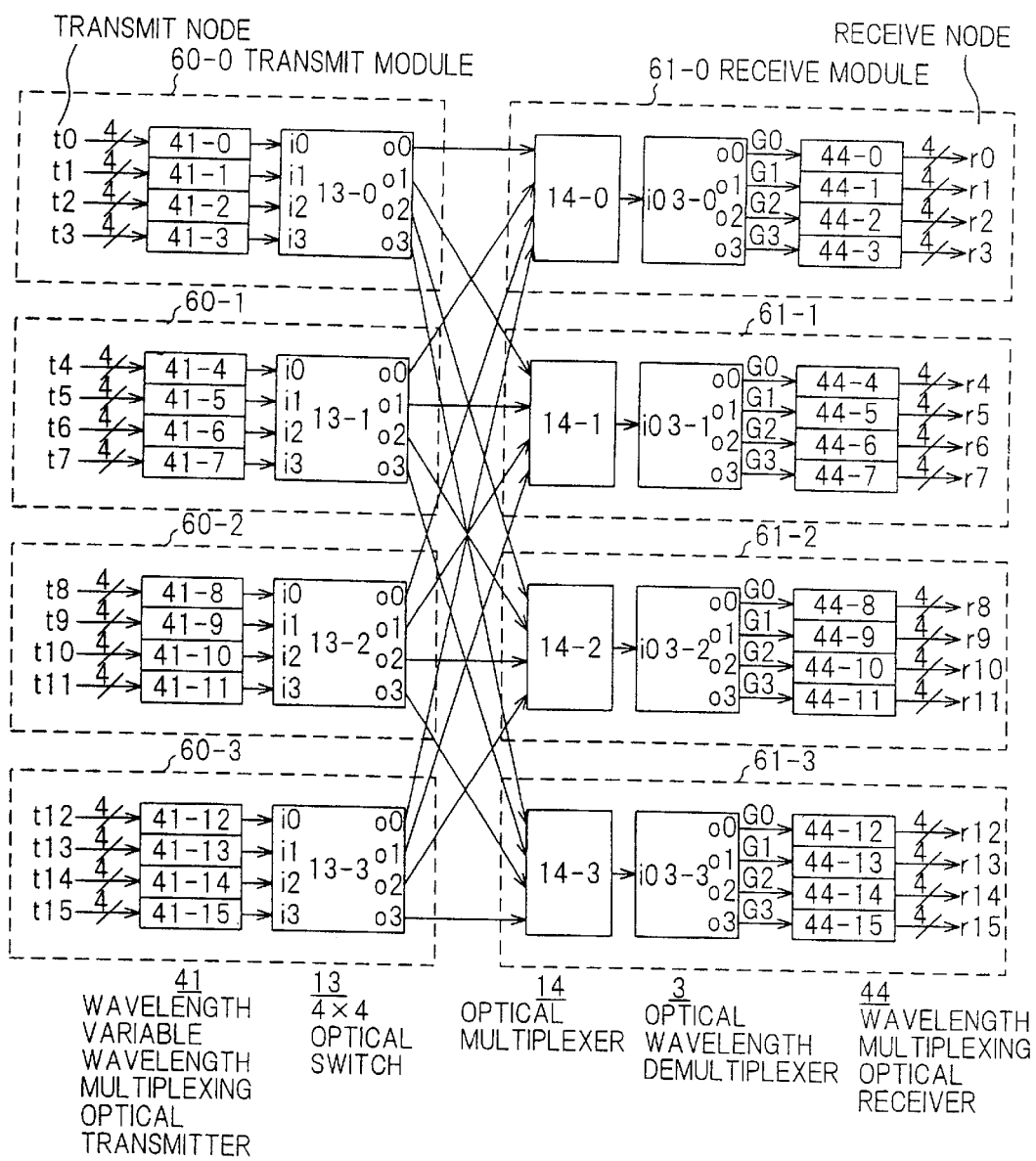
FIG. 15 is a block diagram showing the composition of an optical network in a sixth preferred embodiment according to the invention.

FIG. 15 shows the composition of the sixth preferred embodiment. The sixth embodiment is a 16×16 optical network that is defined by setting L=M=N=4. This optical network is composed of wavelength tunable WDM optical transmitters 41, 4×4 optical switches 13, optical combiners 14, optical wavelength demultiplexers 3, and WDM optical receivers 44.

The composition and operation of the wavelength tunable WDM optical transmitter 41, optical wavelength demultiplexer 3, and WDM optical receiver 44 in this embodiment are the same as those of the wavelength tunable WDM optical transmitter 41, optical wavelength demultiplexer 3, and WDM optical receiver 44 in the fifth embodiment shown in FIG. 12. Also, the composition and operation of the 4×4 optical switch 13 and optical combiner 14 in this embodiment are the same as those of the 4×4 optical switch 13 and optical combiner 14 in the second embodiment.

In this embodiment, the 16×4 optical switch 2 in the fifth embodiment is replaced by four 4×4 optical switches 13 and four optical combiners 14. So, the four 4×4 optical switches 13 and four optical combiners 14 operates in the same manner as the 16×4 optical switch 2 of the fifth embodiment. Therefore, the optical network in this embodiment has the same effect as the optical network in the fifth embodiment.

Furthermore, comparing with the fifth embodiment, this embodiment has an advantage described below. The optical network of this embodiment, as shown in FIG. 15, can be modularized into a transmit module 60 composed of four wavelength tunable WDM optical transmitters 41 and 4×4 optical switch 13, and a receive module 61 composed of optical combiner 14, optical wavelength demultiplexer 3 and four WDM optical receivers 44. Therefore, when it is desired that the number of nodes be increased, the network can be easily expanded by adding module. For example, an 8×8 optical network is originally constructed by transmit modules 60-0, 60-1 and receive modules 61-0, 61-1. After that, when the number of nodes is increased, it is expanded to 12×12 optical network by adding transmit module 60-2 and receive module 61-2. When the number of nodes is further increased, it is expanded to 16×16 optical network by adding transmit module 60-3 and receive module 61-3. As described above, the optical network in this embodiment has the excellent advantage, modularity.

[Embodiment 7]

Figure 16:
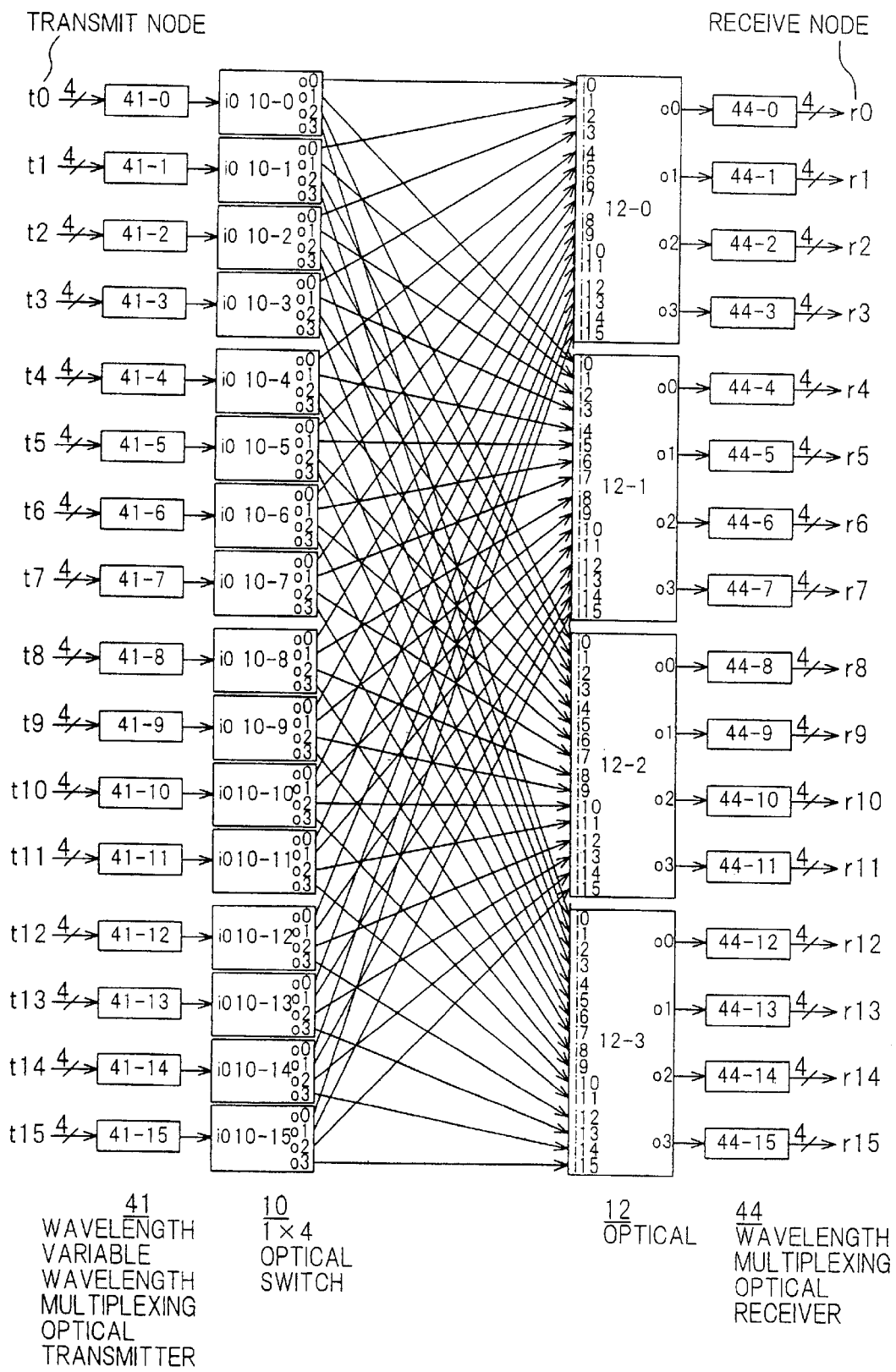
FIG. 16 is a block diagram showing the composition of an optical network in a seventh preferred embodiment according to the invention.

FIG. 16 shows the composition of the seventh preferred embodiment. The seventh embodiment is a 16×16 optical network that is defined by setting L=M=N=4. This optical network is composed of wavelength tunable WDM optical transmitters 41, 1×4 optical switches 10, 16×4 optical wavelength routers 12, and WDM optical receivers 44.

In this embodiment, wavelengths $\lambda 0$, $\lambda 1$, $\lambda 2$, $\lambda 3$ are defined as wavelength group G0, wavelengths $\lambda 4$, $\lambda 5$, $\lambda 6$, $\lambda 7$ are defined as wavelength group G1, wavelengths $\lambda 8$, $\lambda 9$, $\lambda 10$, $\lambda 11$ are defined as wavelength group G2, and wavelengths $\lambda 12$, $\lambda 13$, $\lambda 14$, $\lambda 15$ are defined as wavelength group G3.

The composition and operation of the wavelength tunable WDM optical transmitter 41 and WDM optical receiver 44 in this embodiment are the same as those of the wavelength tunable WDM optical transmitter 41 and WDM optical receiver 44 in the fifth embodiment shown in FIG. 12.

The wavelength tunable WDM optical transmitter 41 outputs converting a 4-bit wide electrical signal into a WDM optical signal with an arbitrary wavelength group of wavelength groups G0, G1, G2 and G3. The WDM optical signal output from the wavelength tunable WDM optical transmitter 41 is input to the 1×4 optical switch 10. The composition and operation of the 1×4 optical switch 10 in this embodiment are the same as those of the 1×4 optical switch 10 in the first embodiment shown in FIG. 6. An optical signal input to the input port can be output from an arbitrary output port. The optical signal output from the 1×4 optical switch 10 is input to the 16×4 optical wavelength router 12.

The composition of the 16×4 optical wavelength router 12 in this embodiment is the same as that of the 16×4 optical wavelength router 12 in the third embodiment. However, the 16×4 optical wavelength router 12 in this embodiment conducts the routing of WDM optical signal for each wavelength group, while the 16×4 optical wavelength router 12 in the third embodiment conducts the routing of optical signal for each wavelength. The relationships between the input and output ports and the wavelength of transmitted optical signal in the 4×4 optical wavelength router 31 of the 16×4 optical wavelength router 12 in this embodiment are as shown in Table 2.

TABLE 2

|  | Output port | | | |
| --- | --- | --- | --- | --- |
|  | o0 | o1 | o2 | o3 |
| Input port i0 | G0 | G1 | G2 | G3 |
| i1 | G1 | G2 | G3 | G0 |
| i2 | G2 | G3 | G0 | G1 |
| i3 | G3 | G0 | G1 | G2 |

The WDM optical signal output from the 16×4 optical wavelength router 12 is converted into 4-bit wide electrical signal by the WDM optical receiver 44.

Here, the operations of the optical network in this embodiment are explained, taking the case that the packet transfer from transmit node t0 to receive node r0 and the packet transfer from transmit node t4 to receive node r1 are performed at the same time. A 4-bit wide packet transmitted from transmit node t0 is converted into WDM optical signal of wavelength group G0 by the wavelength tunable WDM optical transmitter 41-0, input to the 1×4 optical switch 10-0. Similarly, a 4-bit wide packet transmitted from transmit node t4 is converted into WDM optical signal of wavelength group G2 by the wavelength tunable WDM optical transmitter 41-4, input to the 1×4 optical switch 10-4. In the 1×4 optical switches 10-0, 10-4, the optical gate switch 21-0 is turned on and the optical gate switches 21-1 to 21-3 are turned off. Thus, WDM optical signal of wavelength group G0 input to the 1×4 optical switch 10-0 is input to input port i0 of the 16×4 optical wavelength router 12-0, WDM optical signal of wavelength group G2 input to the 1×4 optical switch 10-4 is input to input port i4 of the 16×4 optical wavelength router 12-0. According to Table 2, the WDM optical signal of wavelength group G0 input to input port i0 of the 16×4 optical wavelength router 12-0 is output from its output port o0, converted into 4-bit wide electrical signal by the WDM optical receiver 44-0. On the other hand, the WDM optical signal of wavelength group G2 input to input port i4 of the 16×4 optical wavelength router 12-0 is output from output port o1, converted into 4-bit wide electrical signal by the WDM optical receiver 44-1. By the above operations, the packet transfer from transmit node t0 to receive node r0 and the packet transfer from transmit node t4 to receive node r1 are performed at the same time.

The optical network in this embodiment is a crossbar network, like the first and second conventional examples.

In this embodiment, each transmit node only has to control its own wavelength tunable WDM optical transmitter 41 and one 1×4 optical switch 10. For example, transmit node t0 can send packet to all receive nodes by controlling the transmission wavelength group of the wavelength tunable WDM optical transmitter 41-0, and the 1×4 optical switch 10-0. Therefore, the number of control line required is one between each transmit node and 1×4 optical switch 10, and is only 16 in total. Furthermore, the numbers of transmission wavelength group and optical gate switch 21 to be turned on can be directly obtained from the number of receive node, therefore the routing control is very easy to conduct.

In this embodiment, as transmission wavelength and reception wavelength, each, per one node, four wavelengths are assigned. Therefore, comparing with the third embodiment shown in FIG. 9, when bit rate per one wavelength is equal, the throughput per one node is increased four times.

Figure 1:
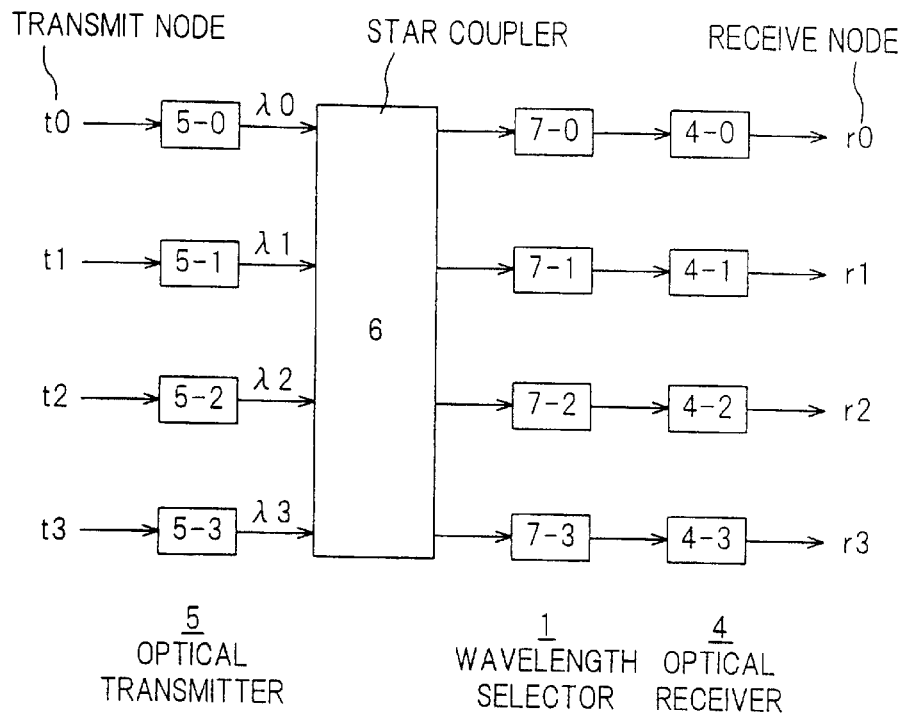
FIG. 1 is a block diagram showing an example of broadcast and select type optical network.
Figure 2:
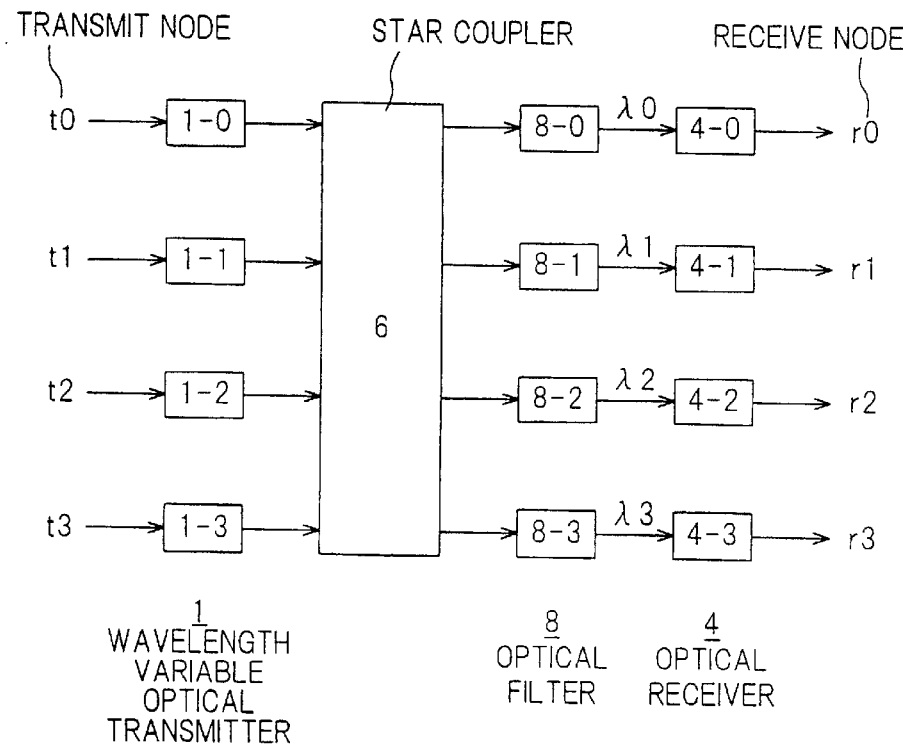
FIG. 2 is a block diagram showing the composition of a first conventional example of optical network.
Figure 3:
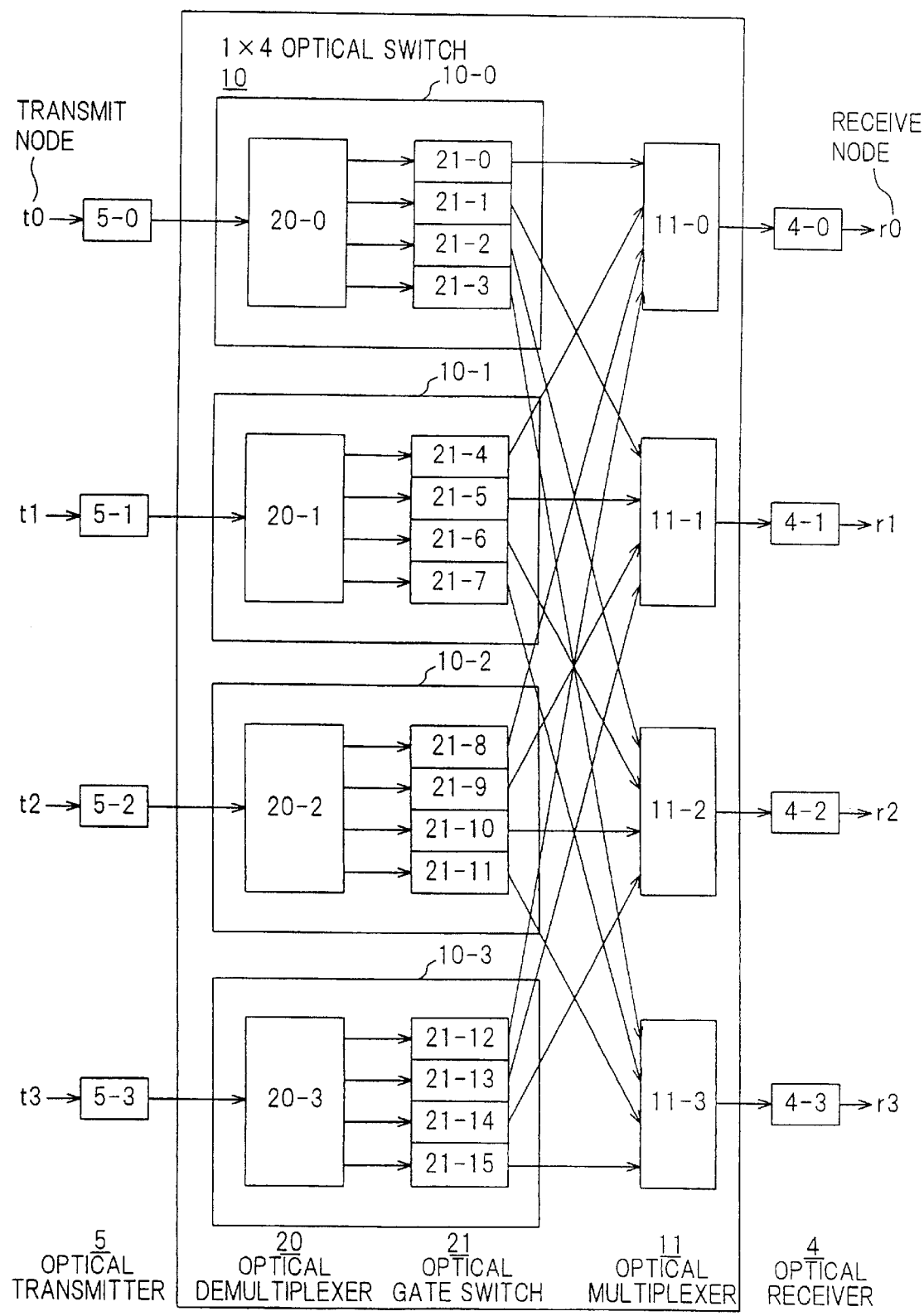
FIG. 3 is a block diagram showing the composition of a second conventional example of optical network.

Also, the number of wavelengths needed in this embodiment is sixteen, which is reduced to a fourth of the number of wavelengths, 64, needed in the case that the throughput similar to that in this embodiment is realized in such a composition as the first conventional example shown in FIG. 2, i.e., in the case that a 16×16 optical network is built assigning four wavelengths to one node. On the other hand, the number of optical gate switches needed in the 16×4 optical switch 2 is 64, which is reduced to a fourth of the number of optical gate switches, 256, needed in the case that a 16×16 optical network is built in such a composition as the second conventional example.

In the fifth embodiment shown in FIG. 12, a theoretical optical loss of 12 dB occurs in the optical combiner 11. On the other hand, in this embodiment, a theoretical optical loss in the optical combiner 30 of the 16×4 optical wavelength router 12 is 6 dB. Since the optical loss in the optical wavelength demultiplexer 3 of the fifth embodiment is equal to that in the 4×4 optical wavelength router 31 of this embodiment, the received optical power of the WDM optical receiver 44 in this embodiment is increased by 6 dB, compared with that in the fifth embodiment.

The 16×4 optical wavelength router 12 in this embodiment is composed of the 4×1 optical combiner 30 and 4×4 optical wavelength router 31 that are commercially available. So, not needing an asymmetrical particular device such as a 16×4 arrayed waveguide grating type optical router, it has a lower cost.

In the optical network of this embodiment, since the 1×4 optical switch 10 is composed of the optical splitter 20 and four optical gate switches 21 as shown in FIG. 6, by simultaneously turning on multiple optical gate switches 21 in one 1×4 optical switch 10, the multicast to receive nodes that are assigned with a same reception wavelength can be performed. In the same manner as described in the fifth embodiment shown in FIG. 12, the multicast from an arbitrary transmit node to multiple arbitrary ones of receive nodes r0, r4, r8 and r12, the multicast from an arbitrary transmit node to multiple arbitrary ones of receive nodes r1, r5, r9 and r13, the multicast from an arbitrary transmit node to multiple arbitrary ones of receive nodes r2, r6, r10 and r14, and the multicast from an arbitrary transmit node to multiple arbitrary ones of receive nodes r3, r7, r11 and r15 can be performed. However, since the transmission characteristic of the 4×4 optical wavelength router 31 is as shown in Table 2, depending on transmit node to send packet, the correspondences between the transmission wavelength group and the group of receive nodes to be multicast are varied. For example, when the transmission wavelength group of the wavelength tunable WDM optical transmitter 41-0 in transmit node t0 is G0 and the optical gate switches 21-0 to 21-3 in the 1×4 optical switch 10-0 are all turned on, the transmitted packet is multicast to receive nodes r0, r4, r8 and r12. However, when the transmission wavelength group of the wavelength tunable WDM optical transmitters 41-4 in transmit node t4 is G0 and the optical gate switches 21-0 to 21-3 in the 1×4 optical switch 10-4 are all turned on, the transmitted packet is multicast to receive nodes r3, r7, r11 and r15.

[Embodiment 8]

Figure 17:
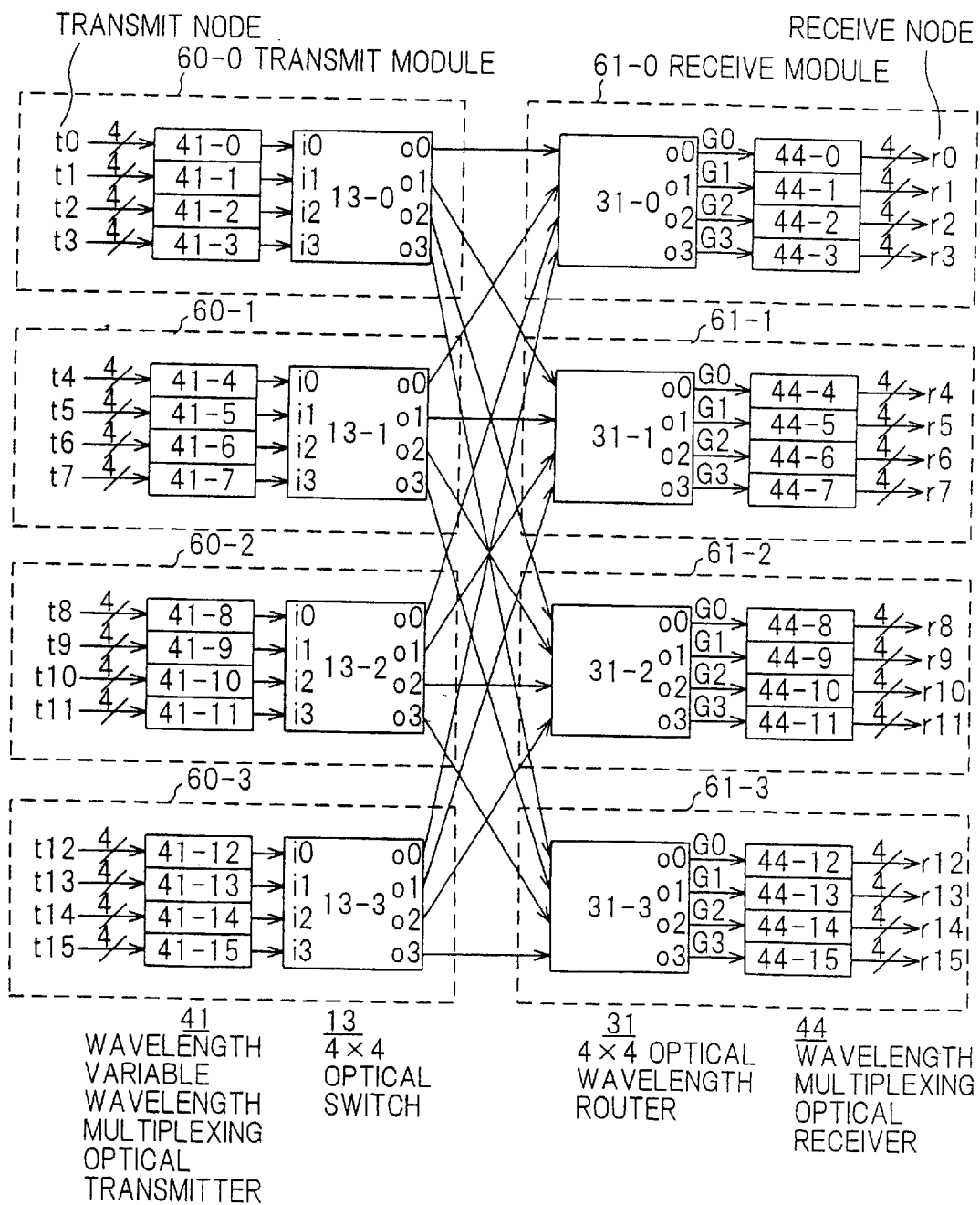
FIG. 17 is a block diagram showing the composition of an optical network in an eighth preferred embodiment according to the invention.

FIG. 17 shows the composition of the eighth preferred embodiment. The eighth embodiment is a 16×16 optical network that is defined by setting L=M=N=4. This optical network is composed of wavelength tunable WDM optical transmitters 41, 4×4 optical switches 13, 4×4 optical wavelength routers 31, and WDM optical receivers 44.

In this embodiment, wavelengths λ0, λ1, λ2, λ3 are defined as wavelength group G0, wavelengths λ4, λ5, λ6, λ7 are defined as wavelength group G1, wavelengths λ8, λ9, λ10, λ11 are defined as wavelength group G2, and wavelengths λ12, λ13, λ14, λ15 are defined as wavelength group G3.

The composition and operation of the wavelength tunable WDM optical transmitters 41, 4×4 optical wavelength routers 31, and WDM optical receivers 44 in this embodiment are the same as those in the seventh embodiment. Also, the composition and operation of the 4×4 optical switches 13 are the same as those in the second embodiment.

Here, the operations of the optical network in this embodiment are explained, taking the case that the packet transfer from transmit node t0 to receive node r0 and the packet transfer from transmit node t4 to receive node r1 are performed at the same time. A 4-bit wide packet transmitted from transmit node t0 is converted into WDM optical signal of wavelength group G0 by the wavelength tunable WDM optical transmitter 41-0, input to input port i0 of the 4×4 optical switch 13-0. Similarly, a 4-bit wide packet transmitted from transmit node t4 is converted into WDM optical signal of wavelength group G2 by the wavelength tunable WDM optical transmitter 41-4, input to input port i0 of the 4×4 optical switch 13-1. In the 4×4 optical switches 13-0, 13-1, the optical gate switch 21-0 is turned on and the optical gate switches 21-1 to 21-3 are turned off. Thus, WDM optical signal of wavelength group G0 input to the 4×4 optical switch 13-0 is input to input port i0 of the 4×4 optical wavelength router 31-0, WDM optical signal of wavelength group G2 input to the 4×4 optical switch 13-1 is input to input port i1 of the 4×4 optical wavelength router 31-0. According to Table 2, the WDM optical signal of wavelength group G0 input to input port i0 of the 4×4 optical wavelength router 31-0 is output from its output port o0, converted into 4-bit wide electrical signal by the WDM optical receiver 44-0. On the other hand, the WDM optical signal of wavelength group G2 input to input port i1 of the 4×4 optical wavelength router 31-0 is output from its output port o1, converted into 4-bit wide electrical signal by the WDM optical receiver 44-1. By the above operations, the packet transfer from transmit node t0 to receive node r0 and the packet transfer from transmit node t4 to receive node r1 are performed at the same time.

The optical network in this embodiment is a crossbar network, like the first and second conventional examples.

In this embodiment, each transmit node only has to control its own wavelength tunable WDM optical transmitter 41 and one 1×4 optical switch 10. For example, transmit node t0 can send packet to all receive nodes by controlling the transmission wavelength group of the wavelength tunable WDM optical transmitter 41-0, and the 1×4 optical switch 10-0 in the 4×4 optical switch 13-0. Therefore, the number of control line required is one between each transmit node and 1×4 optical switch 10, and is only 16 in total. Furthermore, the numbers of transmission wavelength group and optical gate switch 21 to be turned on can be directly obtained from the number of receive node, therefore the routing control is very easy to conduct.

In this embodiment, as transmission wavelength and reception wavelength, each, per one node, four wavelengths are assigned. Therefore, comparing with the third embodiment shown in FIG. 9, when bit rate per one wavelength is equal, the throughput per one node is increased four times.

Also, the number of wavelengths needed in this embodiment is sixteen, which is reduced to a fourth of the number of wavelengths, 64, needed in the case that the throughput similar to that in this embodiment is realized in such a composition as the first conventional example shown in FIG. 2, i.e., in the case that a 16×16 optical network is built assigning four wavelengths to one node. On the other hand, the number of optical gate switches needed in the 4×4 optical switch 13 is 64, which is reduced to a fourth of the number of optical gate switches, 256, needed in the case that a 16×16 optical network is built in such a composition as the second conventional example.

Although, in the sixth embodiment, a theoretical optical loss of 6 dB occurs in the optical combiner 14, in this embodiment, this optical loss does not occur. Since the optical loss in the optical wavelength demultiplexer 3 of the sixth embodiment is equal to that in the 4×4 optical wavelength router 31 of this embodiment, the received optical power of the WDM optical receivers 44 in this embodiment is increased by 6 dB, compared with that in the sixth embodiment.

The optical network of this embodiment, as shown in FIG. 17, can be modularized into a transmit module 60 composed of four wavelength tunable WDM optical transmitters 41 and 4×4 optical switch 13, and a receive module 61 composed of 4×4 optical wavelength router 31 and four WDM optical receivers 44. Therefore, when it is desired that the number of nodes be increased, the network can be easily expanded by adding module. For example, an 8×8 optical network is originally constructed by transmit modules 60-0, 60-1 and receive modules 61-0, 61-1. After that, when the number of nodes is increased, it is expanded to 12×12 optical network by adding transmit module 60-2 and receive module 61-2. When the number of nodes is further increased, it is expanded to 16×16 optical network by adding transmit module 60-3 and receive module 61-3. As described above, the optical network in this embodiment has the excellent advantage, modularity.

In the optical network of this embodiment, since the 1×4 optical switch 10 in the 4×4 optical switch 13 is composed of the optical splitter 20 and four optical gate switches 21 as shown in FIG. 6, by simultaneously turning on multiple optical gate switches 21 in one 1×4 optical switch 10, the multicast to receive nodes that are assigned with a same reception wavelength can be performed. In the same manner as described in the seventh embodiment shown in FIG. 16, the multicast from an arbitrary transmit node to multiple arbitrary ones of receive nodes r0, r4, r8 and r12, the multicast from an arbitrary transmit node to multiple arbitrary ones of receive nodes r1, r5, r9 and r13, the multicast from an arbitrary transmit node to multiple arbitrary ones of receive nodes r2, r6, r10 and r14, and the multicast from an arbitrary transmit node to multiple arbitrary ones of receive nodes r3, r7, r11 and r15 can be performed.

[Embodiment 9]

Figure 18:
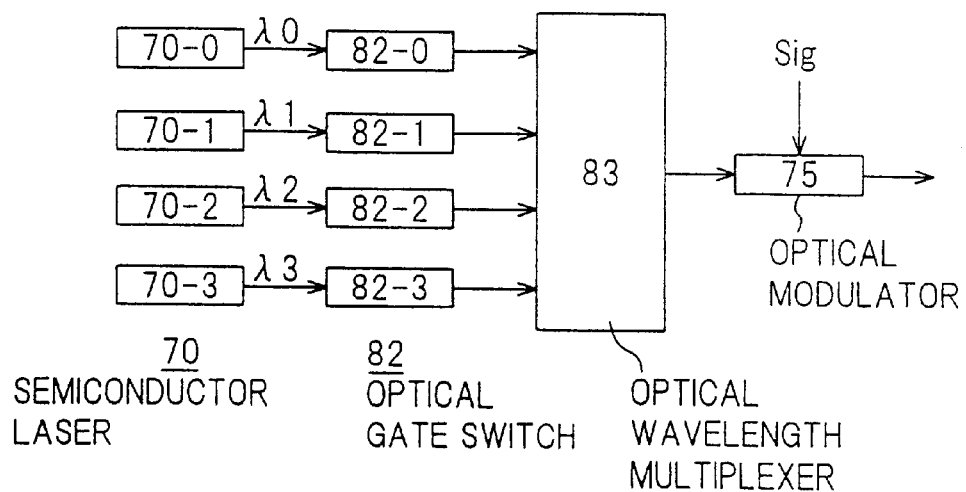
FIG. 18 is a block diagram showing the composition of a wavelength tunable optical transmitter of an optical network in a ninth preferred embodiment according to the invention.

The ninth preferred embodiment is a 16×16 optical network that is defined by setting L=M=N=4, and in this embodiment, only the wavelength tunable optical transmitters 1 in the optical networks in the first to fourth embodiments shown in FIGS. 4 to 11 are altered as shown in FIG. 18. So, in this embodiment, the operations of the wavelength tunable optical transmitter 1 are mainly explained.

The wavelength tunable optical transmitter 1 of this embodiment is composed of four semiconductor lasers 70, four optical gate switches 82, an optical wavelength multiplexer 83, and an optical modulator 75. The semiconductor lasers 70-0, 70-1, 70-2 and 70-3 output lights with wavelengths λ0, λ1, λ2 and λ3, respectively. The optical gate switches 82 are the same semiconductor optical amplifier as the optical gate switches 21 in the first to eighth embodiments. The optical wavelength multiplexer 83 is an arrayed waveguide grating type optical wavelength multiplexer, and outputs multiplexing lights with wavelengths $\lambda 0, \lambda 1, \lambda 2, \lambda 3$ output from the optical gate switches 82-0, 82-1, 82-2 and 82-3. By turning on/off the optical gate switches 82-0, 82-1, 82-2 and 82-3, an arbitrary wavelength light selected from lights with wavelengths $\lambda 0, \lambda 1, \lambda 2, \lambda 3$ can be output from the optical wavelength multiplexer 83. Also, by turning on multiple optical gate switches 82, multiple wavelength lights can be selected. The optical modulator 75 is an electroabsorption modulator, and outputs modulating input light by electrical signal. When WDM light with multiple wavelengths is input, the optical modulator 75 modulates, in the lump, all the wavelength lights by the same electrical signal.

As explained above, the wavelength tunable optical transmitter 1 can output an optical signal with arbitrary wavelength of wavelengths $\lambda 0$ to $\lambda 3$. Also, by simultaneously turning on multiple optical gate switches 82, a WDM optical signal that optical signals with multiple wavelengths are multiplexed can be output from there. For example, when the optical gate switches 82-2, 82-3 are turned on and the optical gate switches 82-0, 82-1 are turned off, the WDM optical signal with wavelengths $\lambda 2$ and $\lambda 3$ is output from the wavelength tunable optical transmitter 1. In this case, the optical signals with wavelengths $\lambda 2$ and $\lambda 3$ are modulated by the same electrical signal.

By outputting WDM optical signal from the wavelength tunable optical transmitter 1, in the optical network shown in FIG. 11, the multicast to receive nodes connected with a same 4×4 optical wavelength router 31 can be realized. For example, when the WDM optical signal with wavelengths $\lambda 2$ and $\lambda 3$ is output from the wavelength tunable optical transmitter 1 and the optical gate switch 21-8 in the 4×4 optical switch 13-0 is turned on, the optical signal with wavelength $\lambda 2$ is input from input port i0 of the 4×4 optical wavelength router 31-0 through output port o2 to the optical receiver 4-2. On the other hand, the optical signal with wavelength $\lambda 3$ is input from input port i0 of the 4×4 optical wavelength router 31-0 through output port o3 to the optical receiver 4-3. Thus, packet transmitted from transmit node t2 is multicast to receive noes r2 and r3.

As explained above, in this embodiment, by outputting WDM optical signal from the wavelength tunable optical transmitter 1, the multicast from an arbitrary transmit node to multiple arbitrary ones of receive nodes r0, r1, r2 and r3, the multicast from an arbitrary transmit node to multiple arbitrary ones of receive nodes r4, r5, r6 and r7, the multicast from an arbitrary transmit node to multiple arbitrary ones of receive nodes r8, r9, r10 and r11, and the multicast from an arbitrary transmit node to multiple arbitrary ones of receive nodes r12, r13, r14 and r15 can be performed. Also, in the same manner as described in the fourth embodiment, the multicast from an arbitrary transmit node to multiple arbitrary ones of receive nodes r0, r4, r8 and r12, the multicast from an arbitrary transmit node to multiple arbitrary ones of receive nodes r1, r5, r9 and r13, the multicast from an arbitrary transmit node to multiple arbitrary ones of receive nodes r2, r6, r10 and r14, and the multicast from an arbitrary transmit node to multiple arbitrary ones of receive nodes r3, r7, r11 and r15 can be performed. Furthermore, by combining both the multicast manners, for example, the multicast an arbitrary transmit node to receive nodes r0 to r7, or the multicast to all receive nodes, i.e., broadcast, can be performed.

[Embodiment 10]

Figure 19:
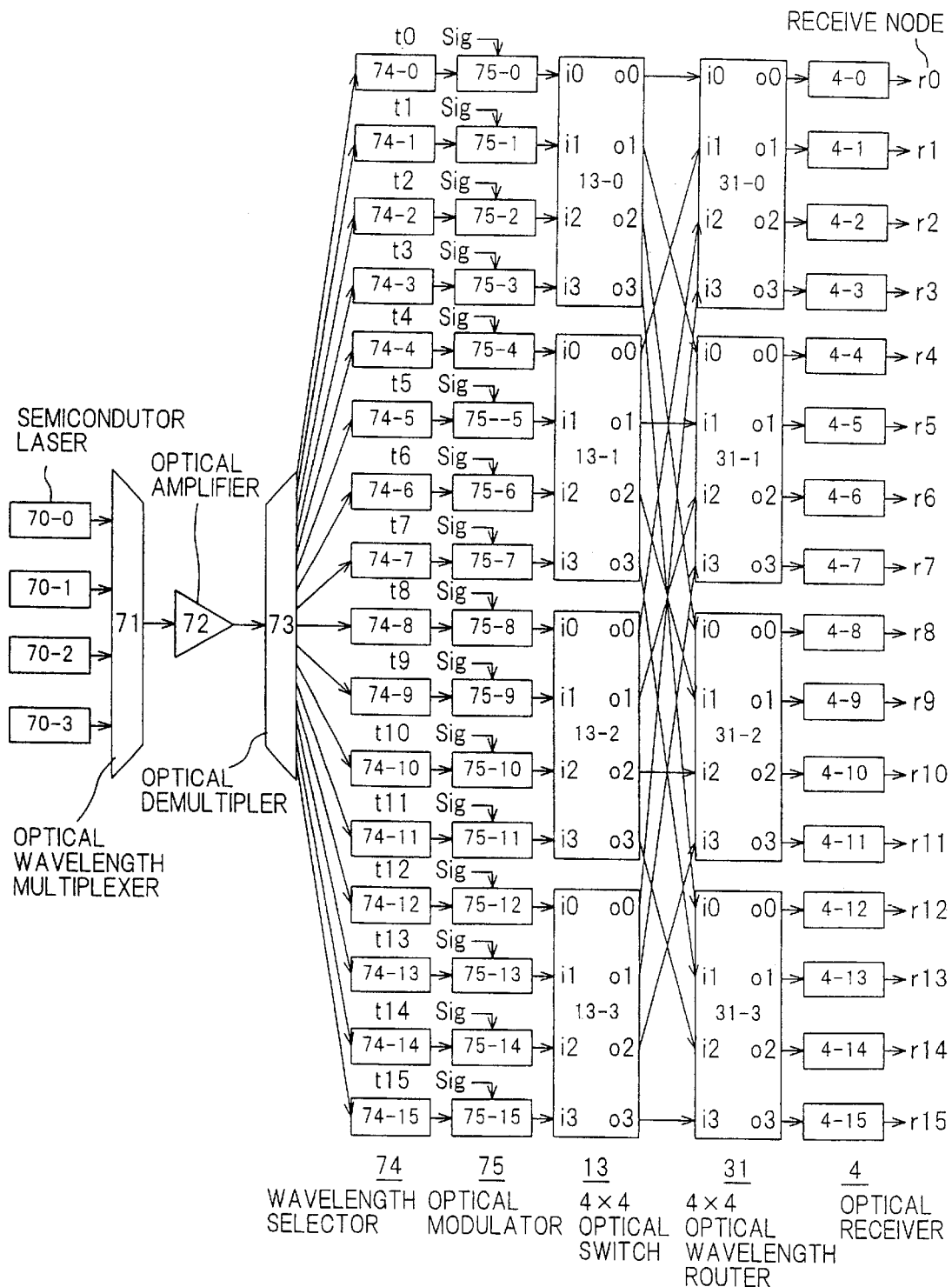
FIG. 19 is a block diagram showing the composition of an optical network in a tenth preferred embodiment according to the invention.

FIG. 19 shows the composition of the tenth preferred embodiment. The tenth embodiment is a 16×16 optical network that is defined by setting M=N=4, K=16. The optical network is composed of semiconductor lasers 70, an optical wavelength multiplexer 71, an optical amplifier 72, an optical splitter 73, wavelength selectors 74, optical modulators 75, 4×4 optical switches 13, 4×4 optical wavelength routers 31, and optical receivers 4. In this embodiment, the wavelength tunable optical transmitters 1 in the optical network in the fourth embodiment shown in FIG. 11 are replaced with the semiconductor lasers 70, optical wavelength multiplexer 71, optical amplifier 72, optical splitter 73, wavelength selectors 74, and optical modulators 75. So, in this embodiment, the operations of the wavelength tunable optical transmitter are mainly explained.

The semiconductor lasers 70-0, 70-1, 70-2 and 70-3 output lights with wavelengths $\lambda 0, \lambda 1, \lambda 2$ and $\lambda 3$, respectively. The optical wavelength multiplexer 71 is an arrayed waveguide grating type optical wavelength multiplexer, and outputs WDM optical signal that lights with wavelengths $\lambda 0, \lambda 1, \lambda 2, \lambda 3$ to be input are multiplexed. The optical amplifier 72 is an erbium-doped optical fiber amplifier, and outputs amplifying WDM light to be input. This WDM light is divided into 16 parts by the optical splitter 73, which are distributed to the wavelength selectors 74-0 to 74-15.

Figure 20:
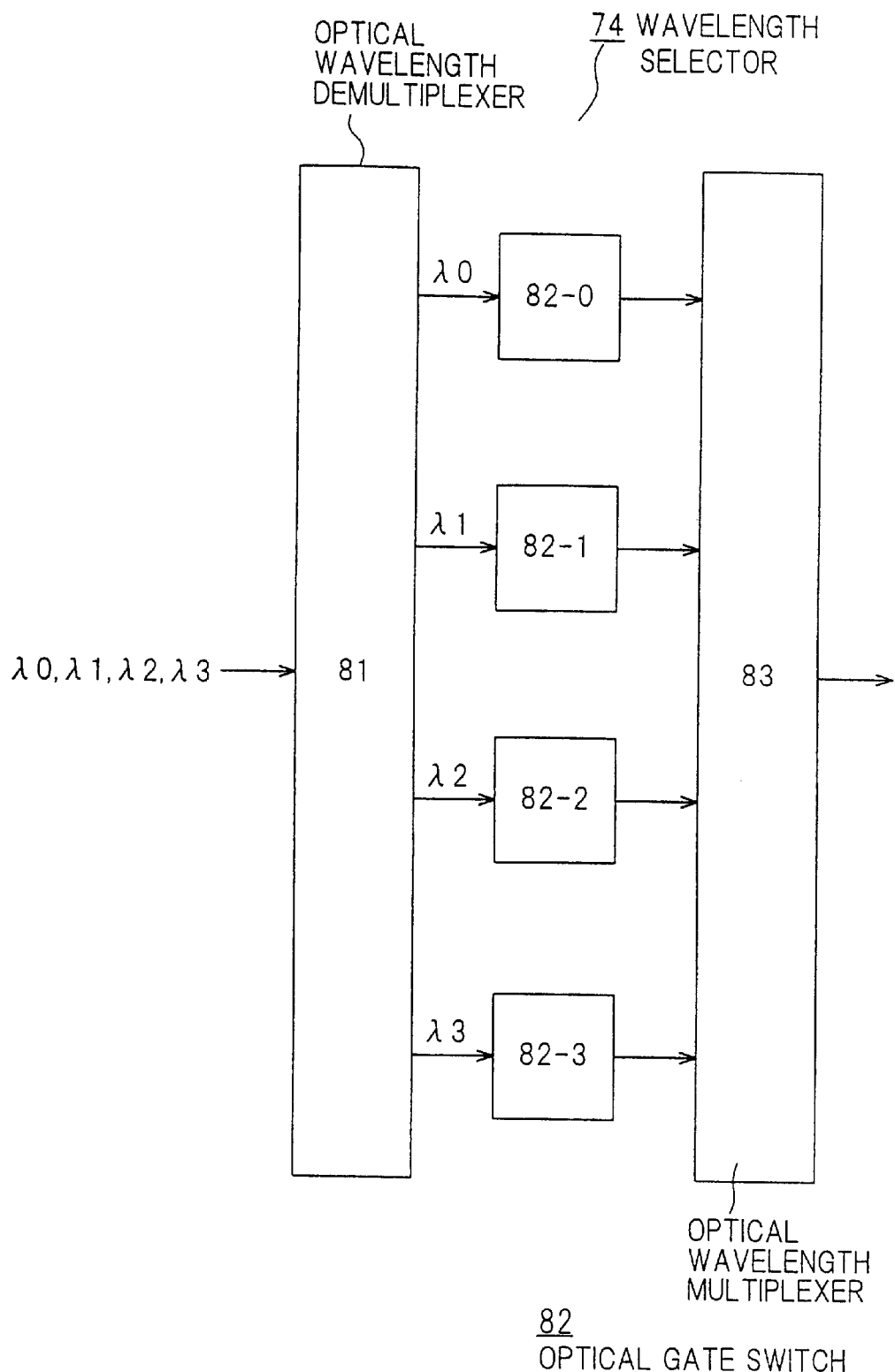
FIG. 20 is a block diagram showing the composition of a wavelength selector 74 in the tenth embodiment.
Figure 21:
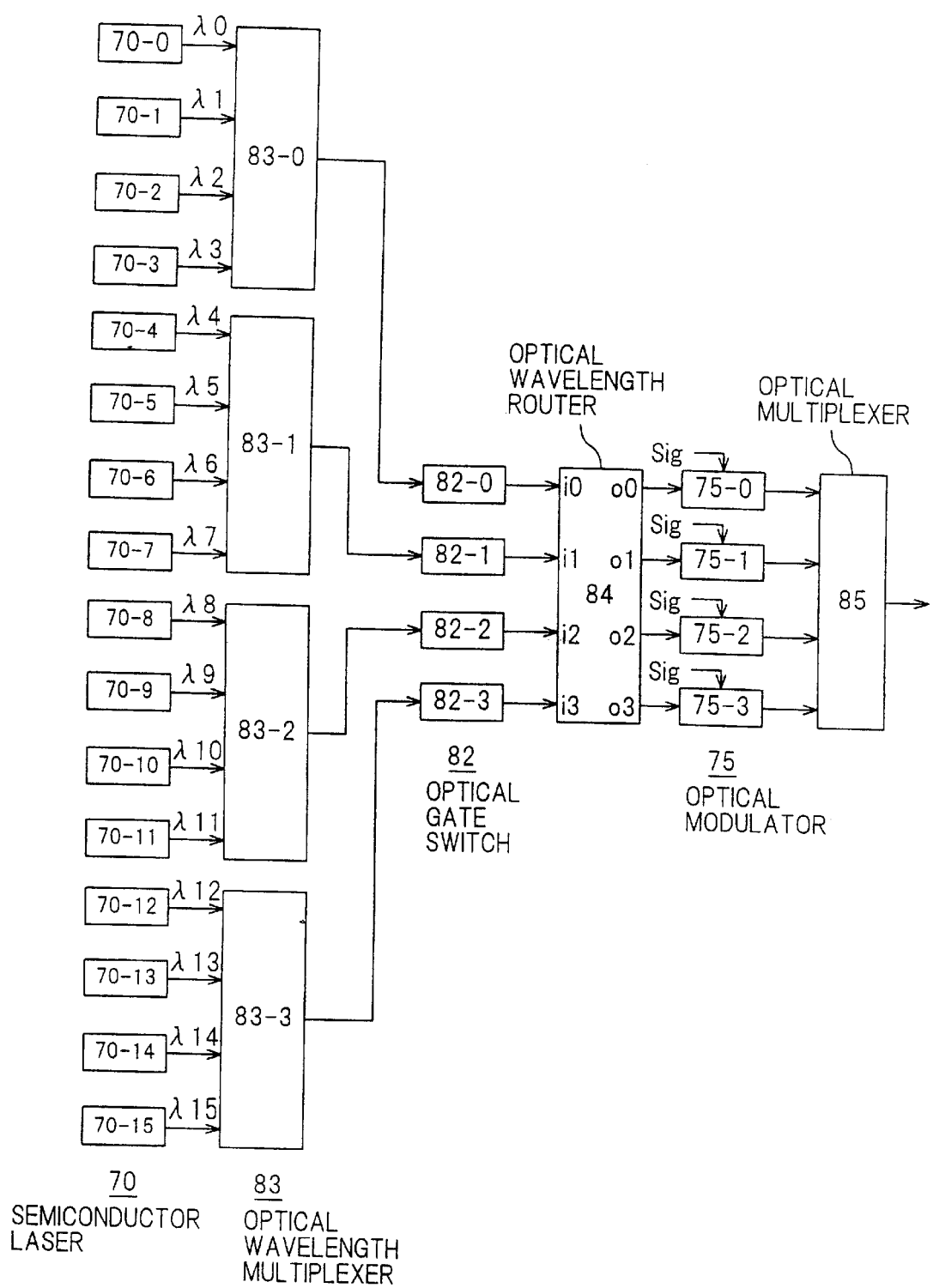
FIG. 21 is a block diagram showing the composition of a wavelength tunable WDM optical transmitter 41 of an optical network in an eleventh preferred embodiment according to the invention.

The wavelength selector 74 is, as shown in FIG. 20, composed of an optical wavelength demultiplexer 81, four optical gate switches 82, and an optical wavelength multiplexer 83. The optical wavelength demultiplexer 81 is an arrayed waveguide grating type optical wavelength demultiplexer, which, when WDM light with wavelengths $\lambda 0$ to $\lambda 3$ is input to its input port, outputs demultiplexing the light into each wavelength light. Lights with wavelengths $\lambda 0, \lambda 1, \lambda 2, \lambda 3$ are input to the optical gate switches 82-0, 82-1, 82-2 and 82-3, respectively. The optical gate switch 82 is the same semiconductor optical amplifier as the optical gate switches 21 in the first to eighth embodiments. Lights with wavelengths $\lambda 0, \lambda 1, \lambda 2, \lambda 3$ and output from the optical gate switches 82-0, 82-1, 82-2 and 82-3, respectively, are multiplexed by the optical wavelength multiplexer 83. Thus, by turning on/off the optical gate switches 82-0 to 82-3 in the wavelength selector 74, light with arbitrary wavelength can be output selectively. For example, by turning on the optical gate switch 82-0 and turning off the others, light with wavelength $\lambda 0$ can be output selectively. Also, by turning on multiple optical gate switches 82, lights with multiple wavelengths can be output selectively. For example, by turning on the optical gate switches 82-1, 82-2 and turning off the optical gate switches 82-0, 82-3, lights with wavelengths $\lambda 1, \lambda 2$ can be selected, output as wavelength multiplexed light from the wavelength selector 74.

The optical modulator 75 is an electroabsorption modulator, and outputs modulating input light by electrical signal. When WDM light with multiple wavelengths is input from the wavelength selector 74 to the optical modulator 75, the optical modulator 75 modulates, in the lump, all the wavelength lights by the same electrical signal.

As described above, for example, when the wavelength selectors 74-0, 74-1 select lights with wavelengths $\lambda 0$ and $\lambda 1$, respectively, optical signal with wavelength $\lambda 0$ is transmitted from transmit node t0 and optical signal with wavelength $\lambda 1$ is transmitted from transmit node t1.

Also, when the wavelength selector 74 selects light with multiple wavelengths, WDM optical signal where optical signals with multiple wavelengths are multiplexed can be output from its transmit node. For example, when the wavelength selector 74-2 selects light with wavelengths $\lambda 2, \lambda 3$, WDM optical signal with wavelengths $\lambda 2, \lambda 3$ can be output from transmit node t2. In this case, optical signal with wavelength $\lambda 2$ and optical signal with wavelength $\lambda 3$ are modulated by the same electrical signal.

In this embodiment, by thus outputting WDM optical signal from wavelength tunable optical transmitter, the multicast and broadcast can be performed like the case of the ninth embodiment.

In this embodiment, WDM light output from the semiconductor lasers 70-0 to 70-3 are distributed to all transmit nodes, and each transmit node is provided with the wavelength selector 74 and optical modulator 75 that output selecting light with multiple wavelengths. Because of this, it has a lower cost and lower consumed power, comparing with the optical network in the ninth embodiment. In the ninth embodiment, for all wavelength tunable optical transmitters, 64 semiconductor lasers 70 and 64 optical gate switches 82 are needed. In contrast, in this embodiment, 4 semiconductor lasers 70 and 64 optical gate switches 82 only are needed. Hence, the number of the semiconductor lasers 70 is reduced to a sixteenth. Also, although in the ninth embodiment, the stabilization of wavelength in the semiconductor laser 70 of each transmit node needs to be controlled separately, in this embodiment, since the semiconductor lasers 70-0 to 70-3 are used in common, the wavelength can be central-controlled.

[Embodiment 11]

The eleventh preferred embodiment is a 16×16 optical network that is defined by setting L=M=N=4, and in this embodiment, only the wavelength tunable WDM optical transmitter 41 in the optical network in the eighth embodiment shown in FIG. 17 is altered as shown in FIG. 18. So, in this embodiment, the operations of the wavelength tunable WDM optical transmitter 41 are mainly explained.

In this embodiment, wavelengths $\lambda 0$, $\lambda 1$, $\lambda 2$, $\lambda 3$ are defined as wavelength group G0, wavelengths $\lambda 4$, $\lambda 5$, $\lambda 6$, $\lambda 7$ are defined as wavelength group G1, wavelengths $\lambda 8$, $\lambda 9$, $\lambda 10$, $\lambda 11$ are defined as wavelength group G2, and wavelengths $\lambda 12$, $\lambda 13$, $\lambda 14$, $\lambda 15$ are defined as wavelength group G3.

The wavelength tunable WDM optical transmitter 41 in this embodiment is composed of 16 semiconductor lasers 70, four optical wavelength multiplexers 83, four optical gate switches 82, an optical wavelength router 84, four optical modulators 75, and an optical combiner 85. The semiconductor lasers 70-0 to 70-15 output lights with wavelengths $\lambda 0$ to $\lambda 15$, respectively. The optical wavelength multiplexer 83 is an arrayed waveguide grating type optical wavelength multiplexer, each of which multiplexes light with different wavelengths. WDM lights of wavelength groups G0, G1, G2 and G3 each are output from the optical wavelength multiplexers 83-0, 83-1, 83-2 and 83-3, respectively. The optical gate switch 82 is the same semiconductor optical amplifier as the optical gate switches 21 in the first to eighth embodiments. The optical wavelength router 84 is an arrayed waveguide grating type optical wavelength router, where, when the WDM lights of wavelength groups G0, G1, G2 and G3 are input to its input ports i0 to i3, respectively, the wavelengths of lights output from output ports o0 to o3 are as shown in Table 3.

TABLE 3

|  | Output port | | | |
| --- | --- | --- | --- | --- |
|  | o0 | o1 | o2 | o3 |
| Input port i0 | $\lambda_0$ | $\lambda_1$ | $\lambda_2$ | $\lambda_3$ |
| i1 | $\lambda_4$ | $\lambda_5$ | $\lambda_6$ | $\lambda_7$ |
| i2 | $\lambda_8$ | $\lambda_9$ | $\lambda_{10}$ | $\lambda_{11}$ |
| i3 | $\lambda_{12}$ | $\lambda_{13}$ | $\lambda_{14}$ | $\lambda_{15}$ |

As understood from Table 3, the optical wavelength router 84 demultiplexes the WDM light of each wavelength group, which is input to its input port, into each wavelength light and outputs it from its different output ports. Such an optical wavelength router is realized by setting the free spectral range of arrayed waveguide grating to be equal to the interval of wavelength groups. The optical modulator 75 is an electroabsorption modulator, and outputs modulating input WDM light by electrical signal. The optical combiner 85 outputs combining lights output from the optical modulators 75-0 to 75-3.

In the wavelength tunable WDM optical transmitter 41, by turning on/off the optical gate switches 82-0 to 82-3, WDM light of arbitrary wavelength group can be selected from WDM lights of wavelength groups G0 to G3, then modulated by electrical signal different for each wavelength, output from the optical combiner 85. Also, by turning on multiple optical gate switches 82, WDM light with multiple wavelength groups can be output from the optical combiner 85. For example, by turning on the optical gate switches 82-2, 82-3 and turning off the optical gate switches 82-0, 82-1, WDM light of wavelength group G2 is input to input port i2 of optical wavelength router 84, and WDM light of wavelength group G3 is input to input port i3. Hereupon, according to Table 3, WDM light with wavelengths $\lambda 8$ and $\lambda 12$ is output from output port o0, WDM light with wavelengths $\lambda 9$ and $\lambda 13$ from output port o1, WDM light with wavelengths $\lambda 10$ and $\lambda 14$ from output port o2, and WDM light with wavelengths $\lambda 11$ and $\lambda 15$ from output port o3. These WDM lights are modulated by the optical modulators 75-0, 75-1, 75-2 and 75-3, respectively, then multiplexed by the optical combiner 85. As a result, WDM optical signal of wavelength groups G2 and G3 is output from the optical combiner 85. In this case, the WDM optical signal of wavelength group G2 and WDM optical signal of wavelength group G3 are modulated by the same 4-bit wide electrical signal.

In this way, by outputting WDM optical signal, which is obtained by further multiplexing WDM optical signals of multiple wavelength groups, from the wavelength tunable WDM optical transmitters 41, in the optical network shown in FIG. 17, the multicast to receive nodes connected with a same 4×4 optical wavelength router 31 can be realized. For example, when the WDM optical signal of wavelength groups G2 and G3 is output from the wavelength tunable WDM optical transmitter 41-2 and the optical gate switch 21-8 in the 4×4 optical switch 13-0 is turned on, the WDM optical signal of wavelength group G2 is input from input port i0 of the 4×4 optical wavelength router 31-0 through output port o2 to the WDM optical receiver 44-2. On the other hand, the WDM optical signal of wavelength group G3 is input from input port i0 of the 4×4 optical wavelength router 31-0 through output port o3 to the WDM optical receiver 44-3. Thus, the packet transmitted from transmit node t2 is multicast to receive nodes r2 and r3.

As explained above, in this embodiment, by outputting WDM optical signal, which is obtained by further multiplexing WDM optical signals of multiple wavelength groups, from the wavelength tunable WDM optical transmitters 41, the multicast from an arbitrary transmit node to multiple arbitrary ones of receive nodes r0, r1, r2 and r3, the multicast from an arbitrary transmit node to multiple arbitrary ones of receive nodes r4, r5, r6 and r7, the multicast from an arbitrary transmit node to multiple arbitrary ones of receive nodes r8, r9, r10 and r11, and the multicast from an arbitrary transmit node to multiple arbitrary ones of receive nodes r12, r13, r14 and r15 can be performed. Also, in the same manner as described in the eighth embodiment, the multicast from an arbitrary transmit node to multiple arbitrary ones of receive nodes r0, r4, r8 and r12, the multicast from an arbitrary transmit node to multiple arbitrary ones of receive nodes r1, r5, r9 and r13, the multicast from an arbitrary transmit node to multiple arbitrary ones of receive nodes r2, r6, r10 and r14, and the multicast from an arbitrary transmit node to multiple arbitrary ones of receive nodes r3, r7, r11 and r15 can be performed. Furthermore, by combining both the multicast manners, for example, the multicast an arbitrary transmit node to receive nodes r0 to r7, or the multicast to all receive nodes, i.e., broadcast, can be performed.

[Embodiment 12]

Figure 22:
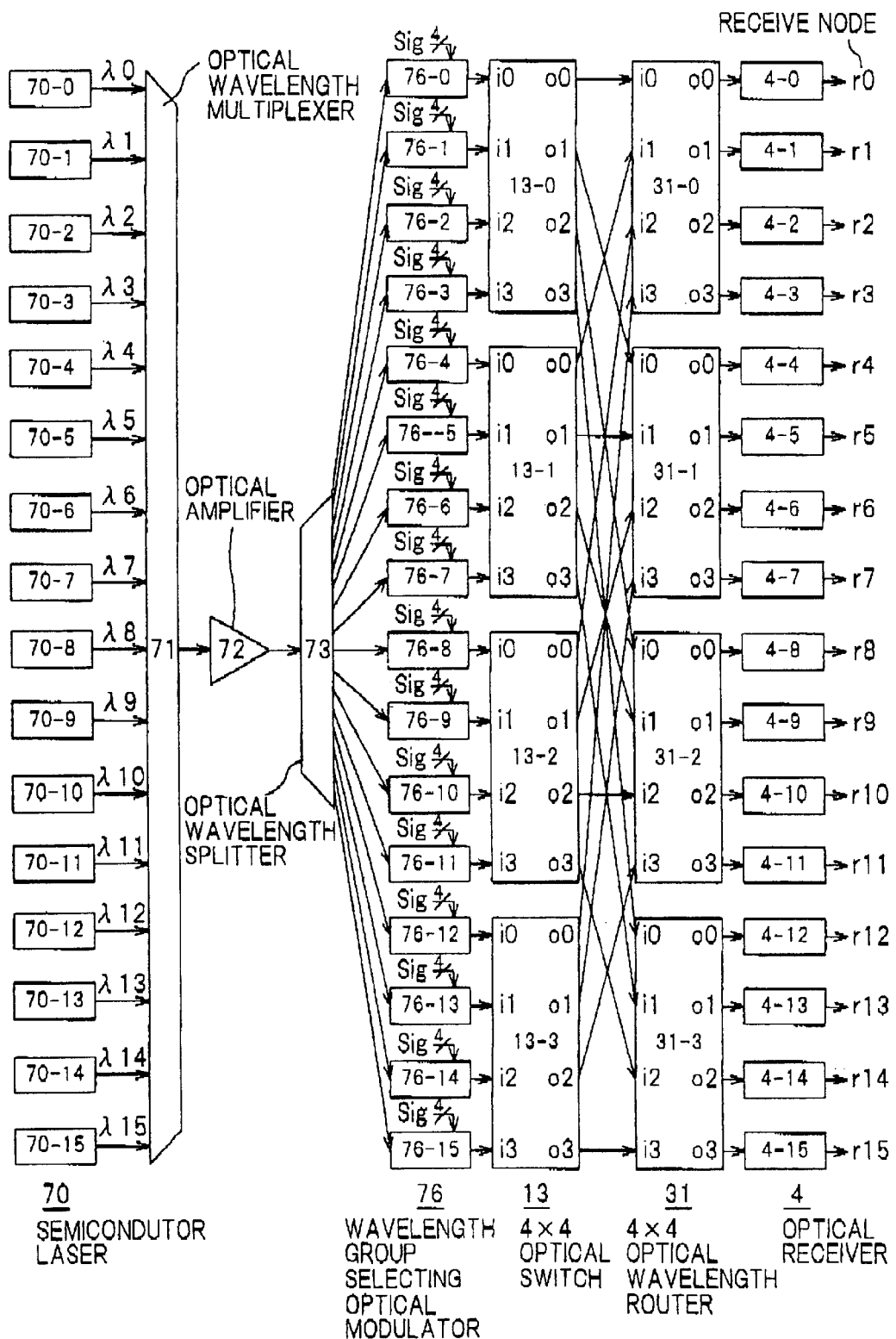
FIG. 22 is a block diagram showing the composition of an optical network in a twelfth preferred embodiment according to the invention.

FIG. 22 shows the composition of the twelfth preferred embodiment. The twelfth embodiment is a 16×16 optical network that is defined by setting L=M=N=4, K=16. The optical network is composed of semiconductor lasers 70, an optical wavelength multiplexer 71, an optical amplifier 72, an optical splitter 73, wavelength group selecting optical modulators 76, 4×4 optical switches 13, 4×4 optical wavelength routers 31, and WDM optical receivers 44. In this embodiment, the wavelength tunable WDM optical transmitters 41 in the optical network in the eighth embodiment shown in FIG. 17 are replaced with the semiconductor lasers 70, optical wavelength multiplexer 71, optical amplifier 72, optical splitter 73, and wavelength group selecting optical modulators 76. So, in this embodiment, the operations of the wavelength tunable WDM optical transmitter are mainly explained.

In this embodiment, wavelengths $\lambda 0, \lambda 1, \lambda 2, \lambda 3$ are defined as wavelength group G0, wavelengths $\lambda 4, \lambda 5, \lambda 6, \lambda 7$ are defined as wavelength group G1, wavelengths $\lambda 8, \lambda 9, \lambda 10, \lambda 11$ are defined as wavelength group G2, and wavelengths $\lambda 12, \lambda 13, \lambda 14, \lambda 15$ are defined as wavelength group G3.

The semiconductor lasers 70-0 to 70-15 output lights with wavelengths $\lambda 0$ to $\lambda 15$, respectively. The optical wavelength multiplexer 72 is an arrayed waveguide grating type optical wavelength multiplexer, and outputs WDM optical signal that lights with wavelengths $\lambda 0$ to $\lambda 15$ to be input are multiplexed. The optical amplifier 72 is an erbium-doped optical fiber amplifier, and outputs amplifying WDM light to be input. This WDM light is splitted into 16 parts by the optical splitter 73, which are distributed to the wavelength group selecting modulators 76-0 to 76-15.

Figure 23:
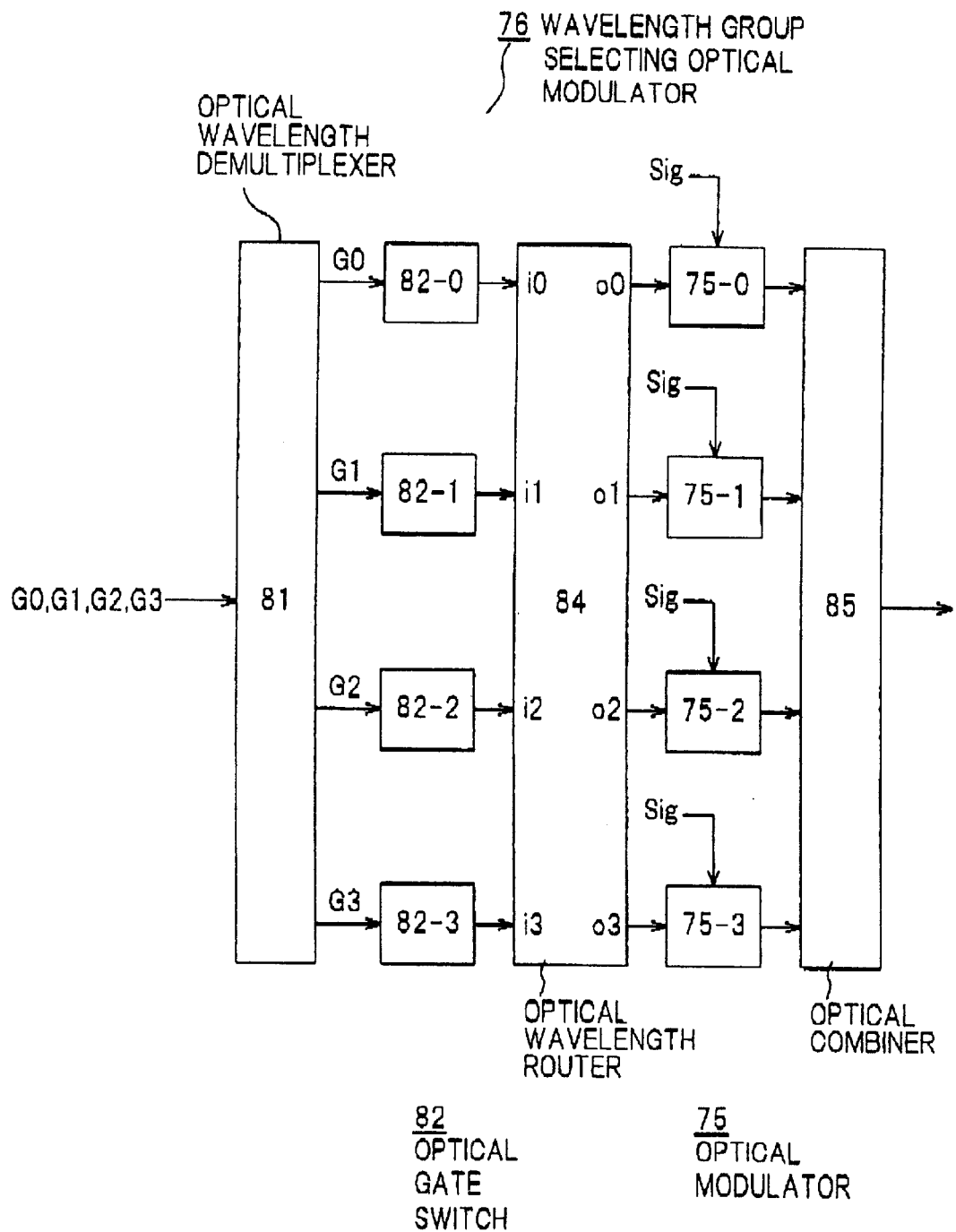
FIG. 23 is a block diagram showing the composition of a wavelength group selecting optical modulator 76 in the twelfth embodiment.

The wavelength group selecting optical modulator 76 is, as shown in FIG. 23, composed of an optical wavelength demultiplexer 81, four optical gate switches 82, an optical wavelength router 84, four optical modulators 75 and an optical combiner 85. The optical wavelength demultiplexer 81 is an arrayed waveguide grating type optical wavelength demultiplexer, which, when WDM light of wavelengths $\lambda 0$ to $\lambda 15$ is input to its input port, outputs demultiplexing the light into each wavelength group. Demultiplexed WDM lights of wavelength groups G0, G1, G2, G3 are input to the optical gate switches 82-0, 82-1, 82-2 and 82-3, respectively. The optical gate switch 82 is the same semiconductor optical amplifier as the optical gate switches 21 in the first to eighth embodiments. WDM lights of wavelength groups G0, G1, G2, G3 output from the optical gate switches 82-0, 82-1, 82-2 and 82-3, respectively, are input the optical wavelength router 84. The optical wavelength router 84 is the same as that in the eleventh embodiment, and demultiplexes the WDM light of each wavelength group, which is input to its input port, into each wavelength light and outputs it from its different output ports.

The optical modulator 75 is an electroabsorption modulator, and modulates, in the lump, input light by electrical signal. The optical combiner 85 outputs combining the WDM optical signals output from the optical modulators 75-0 to 75-3.

In the wavelength group selecting optical modulator 76, by turning on/off the optical gate switches 82-0 to 82-3. WDM light of arbitrary wavelength group can be selected from WDM lights of wavelength groups G0 to G3, then modulated by electrical signal different for each wavelength, output from the optical combiner 85. Also, by turning on multiple optical gate switches 82, WDM light with multiple wavelength groups can be output from the optical combiner 85. For example, by turning on the optical gate switches 82-2, 82-3 and turning off the optical gate switches 82-0, 82-1, WDM light of wavelength group G2 is input to input port i2 of optical wavelength router 84, and WDM light of wavelength group G3 is input to input port i3. Hereupon, according to Table 3, WDM light with wavelengths $\lambda 8$ and $\lambda 12$ is output from output port o0, WDM light with wavelengths $\lambda 9$ and $\lambda 13$ from output port o1, WDM light with wavelengths $\lambda 10$ and $\lambda 14$ from output port o2, and WDM light with wavelengths $\lambda 11$ and $\lambda 15$ from output port o3. These WDM lights are modulated by the optical modulators 75-0, 75-1, 75-2 and 75-3, respectively, then multiplexed by the optical combiner 85. As a result, WDM optical signal of wavelength groups G2 and G3 is output from the optical combiner 85. In this case, the WDM optical signal of wavelength groups G2 and WDM optical signal of wavelength group G3 are modulated by the same 4-bit wide electrical signal.

In this embodiment, by thus outputting WDM optical signal, which is obtained by further multiplexing WDM optical signals of multiple wavelength groups, from the wavelength tunable WDM optical transmitter, the multicast and broadcast can be performed like the case of the eleventh embodiment.

In this embodiment, WDM light output from the semiconductor lasers 70-0 to 70-15 are distributed to all transmit nodes, and each transmit node is provided with the wavelength group selecting optical modulator 76 that selects WDM lights of multiple wavelength groups and outputs modulating these. Because of this, it has a lower cost and lower consumed power, comparing with the optical network in the eleventh embodiment. In the eleventh embodiment, for all the wavelength tunable WDM optical transmitters 41, 256 semiconductor lasers 70 and 64 optical gate switches 82 are needed. In contrast, in this embodiment, 16 semiconductor lasers 70 and 64 optical gate switches 82 only are needed. Hence, the number of the semiconductor lasers 70 is reduced to a sixteenth. Also, although in the eleventh embodiment, the stabilization of wavelength in the semiconductor laser 70 of each transmit node needs to be controlled separately, in this embodiment, since the semiconductor lasers 70-0 to 70-15 are used in common, the wavelength can be central-controlled.

Although in the above embodiments, various constants and specific means for components are limited to specific values or devices, these can be arbitrarily selected within the range, as described below.

For L, M and N in the embodiment, in the first to twelfth embodiments, M=N=4 is set, in the fifth to eighth, eleventh and twelfth embodiments, L=4 is set. However, L, M and N can be arbitrarily selected within the range defined by the appended claims.

Although in the first to twelfth embodiments, a semiconductor optical amplifier is used as the optical gate switch, the other devices can be also used as that. For example, an electroabsorption modulator, an optical switch using the electro-optic effect or acousto-optic effect formed on a lithium niobate substrate, a polymer-waveguide optical switch, a liquid-crystal optical switch, a mechanical optical switch, etc. can be used.

In the first and fifth embodiments, the 16×4 optical switch 2 used is a splitter/combiner type optical switch that is composed of 16 1×4 optical switches 10 and four optical combiners 11. However, the composition of MN×N optical switch is not limited to the splitter/combiner type, and may be any composition where optical signals input from different input ports can be output from same output port.

In the second, fourth, sixth, eighth and ninth to twelfth embodiments, the 4×4 optical switch 13 used is a splitter/combiner type optical switch that is composed of four 1×4 optical switches 10 and four optical combiners 11. However, the composition of N×N optical switch is not limited to the splitter/combiner type, and may be any composition where optical signals input from different input ports can be output from same output port.

In the first to twelfth embodiments, the 1×4 optical switch 10 used is composed of optical splitter 20 and optical gate switches 21. However, the composition of 1×N optical switch is not limited to that. For example, an optical switch using the electro-optic effect or acousto-optic effect formed on a lithium niobate substrate, a polymer-waveguide optical switch, a liquid-crystal optical switch, a mechanical optical switch, etc. can be used.

In the first, second and fifth to eighth embodiments, an arrayed waveguide grating type optical wavelength demultiplexer composed of silica waveguides fabricated on a silicon substrate is used as the optical wavelength demultiplexers 3, 51, 81 or optical wavelength multiplexers 71, 83. However, the material and composition of optical wavelength demultiplexer is not limited to that. For example, the material may be of semiconductor or polymer, and the composition may be an optical wavelength demultiplexer using reflection type diffraction grating or optical fiber grating or an optical splitter that an optical filter is inserted to its each output port.

Although in the third and seventh embodiments, the 16×4 optical wavelength router 12 is composed of four optical combiners 30 and 4×4 optical wavelength router 31, other compositions can be also used as the MN×N optical wavelength router. For example, a 16×4 arrayed waveguide grating type optical wavelength router, an optical wavelength router using reflection type diffraction grating or optical fiber grating or an optical wavelength router that an optical splitter, optical combiner and optical filter are combined can be used.

In the third, fourth, seventh, eighth, and ninth to twelfth embodiments, an arrayed waveguide grating type optical wavelength router composed of silica waveguides fabricated on a silicon substrate is used as the 4×4 optical wavelength routers 31, 84. However, the material and composition of 4×4 optical wavelength router is not limited to that. For example, the material may be of semiconductor or polymer, and the composition may be an optical wavelength demultiplexer using reflection type diffraction grating or optical fiber grating or an optical wavelength demultiplexer that optical combiner and optical filter are combined.

Although in the first to twelfth embodiments, an electro-absorption modulator is used as the optical modulator, the material and composition of optical modulator are not limited to that. For example, it may be an optical modulator using the electro-optic effect or acousto-optic effect in lithium niobate crystal.

In the tenth embodiment, a wavelength selector that is composed of optical wavelength demultiplexer, optical gate switches, optical wavelength multiplexer is used as the wavelength selector 74. However, a wavelength selector may have any composition that can select multiple wavelength lights. For example, an acousto-optic filter made of lithium niobate crystal can be also used.

Advantages of the Invention:

Although described also in the above embodiments, the effects obtained by the application of the invention as described below.

With the application of the invention, the optical network where the control objectives are concentrated close to transmit node can be composed. In particular, when the invention is applied, each transmit node only has to control the transmission wavelength (group) its own wavelength tunable (WDM) optical transmitter and one 1×N optical switch, and it can thereby send packet to all receive nodes. Therefore, the number of control line required is one between each transmit node and 1×N optical switch. Furthermore, the transmission wavelength (group) and output port to be selected in the 1×N optical switch can be directly obtained from the number of receive node, therefore the routing control is very easy to conduct.

With the application of the invention, the optical network with similar scale to that of the first conventional example can be composed by using a N-th of the number of wavelengths in the first conventional example.

With the application of the invention, the optical network with similar scale to that of the second conventional example can be composed by using a M-th of the number of component (e.g., the number of optical gate switches) in the second conventional example.

In the invention, the optical wavelength demultiplexer and the pre-stage optical combiner in the invention are replaced with the optical wavelength router. Thereby, since the combining loss occurred in the optical combiner can be avoided, the received optical power of the optical receiver is increased that much.

With the application of the invention, the MN×M optical wavelength router in the invention can be composed at a lower cost by using a commercially available element, N×1 optical combiner and M×M optical wavelength router.

In the optical network that the invention is applied, the throughput per one node can be enhanced without increasing the quantity of hardware such as optical switch, optical wavelength demultiplexer or optical wavelength router, comparing with the optical network that the invention is applied.

In the optical network that the invention is applied, the transmit side and receive side, respectively, of network can be modularized. Therefore, when the number of nodes is increased/decreased, by adding/cutting module, the scale of network can be easily expanded/reduced. Thus, a network with excellent modularity so called can be constructed.

In the optical network that the invention is applied, by simultaneously turning on multiple optical gate switches in one 1×N optical switch, the multicast to receive nodes that are assigned with a same reception wavelength can be performed.

In the optical network that the invention is applied, by outputting optical signal with multiple wavelengths from the wavelength tunable optical transmitter, the multicast to receive nods that are connected with a same optical wavelength demultiplexer or optical wavelength router can be performed. Also, in the optical network that the invention is applied, by outputting WDM optical signal of multiple wavelength groups from the wavelength tunable WDM optical transmitter, the multicast to receive nodes that are connected with a same optical wavelength demultiplexer or optical wavelength router can be performed.

With the application of the invention, the number of light sources can be reduced. Also, when the light source is central-disposed at one position, the control of wavelength can bed facilitated. For example, it is assumed that the wavelength of signal light is matched to a wavelength reference provided in the network. In this case, although the feedback control will be conducted between the wavelength reference and each light source, in the case that the light sources are dispersively disposed, each feedback loop becomes long and the quantity of hardware is thereby increased, further causing an increase in delay. Thus, the control is difficult to perform. On the other hand, although, when the wavelength of each light source is stabilized relatively, the wavelengths of light sources need to be compared with one another, also in such a case, the central-disposing of light source allows the comparison to be facilitated.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical network, comprising:

wavelength tunable optical transmitters of number MN, where N is an integer of two or more, each of which outputs an optical signal with arbitrary one of M wavelengths $\lambda 1, \lambda 2, \ldots, \lambda M$, where M is an integer of two or more, that are different from one another;

a MN×N optical switch whose input ports are connected to said respective wavelength tunable optical transmitters of number MN, and which allows optical signals input to different input ports to be output from its same output port;

1×M optical wavelength demultiplexers of number N which output demultiplexing optical signal with wavelengths $\lambda 1, \lambda 2, \ldots, \lambda M$ input from output ports of said MN×N optical switch into each wavelength; and optical receivers of number MN which receive optical signals input from said 1×M optical wavelength demultiplexers of number N.

2. An optical network, according to claim 1, wherein:

said MN×N optical switch is composed of 1×N optical switches of number MN, and MN×1 optical combiners of number N, each of which outputs combining optical signals input from each of said 1×N optical switches of number MN.

3. An optical network, according to claim 2, wherein:

said 1×N optical switch is composed of a 1×N optical splitter, and optical gate switches of number N where optical signal input from said 1×N optical splitter is transmitted or interrupted.

4. An optical network, according to claim 3, wherein:

said wavelength tunable optical transmitter is enabled to output a WDM optical signal where optical signals with multiple wavelengths are multiplexed.

5. An optical network, according to claim 4, wherein:

K of said wavelength tunable optical transmitters, where K is an integer of two or more and MN or less, are composed of:

a WDM light source which outputs WDM light that lights with M wavelengths $\lambda 1, \lambda 2, \ldots, \lambda M$, where M is an integer of two or more, that are different from one another are multiplexed;

a 1×K optical splitter which outputs splitting the WDM light input from said WDM light source;

wavelength selectors of number K which output selecting light with single or multiple wavelengths from said WDM light input from said 1×K optical splitter; and optical modulators of number K which output modulating the WDM light input from said wavelength selector by electrical signal.

6. An optical network, according to claim 2, wherein:

said wavelength tunable optical transmitter is enabled to output a WDM optical signal where optical signals with multiple wavelengths are multiplexed.

7. An optical network, according to claim 6, wherein:

K of said wavelength tunable optical transmitters, where K is an integer of two or more and MN or less, are composed of:

a WDM light source which outputs WDM light that lights with M wavelengths $\lambda 1, \lambda 2, \ldots, \lambda M$, where M is an integer of two or more, that are different from one another are multiplexed;

a 1×K optical splitter which outputs splitting the WDM light input from said WDM light source;

wavelength selectors of number K which output selecting light with single or multiple wavelengths from said WDM light input from said 1×K optical splitter; and optical modulators of number K which output modulating the WDM light input from said wavelength selector by electrical signal.

8. An optical network, according to claim 1, wherein:

said wavelength tunable optical transmitter is enabled to output a WDM optical signal where optical signals with multiple wavelengths are multiplexed.

9. An optical network, according to claim 8, wherein:

K of said wavelength tunable optical transmitters, where K is an integer of two or more and MN or less, are composed of:

a WDM light source which outputs WDM light that lights with M wavelengths $\lambda 1, \lambda 2, \ldots, \lambda M$, where M is an integer of two or more, that are different from one another are multiplexed;

a 1×K optical splitter which outputs splitting the WDM light input from said WDM light source;

wavelength selectors of number K which output selecting light with single or multiple wavelengths from said WDM light input from said 1×K optical splitter; and optical modulators of number K which output modulating the WDM light input from said wavelength selector by electrical signal.

* * * * *